(12) United States Patent
Yamamoto

(10) Patent No.: US 11,579,369 B2
(45) Date of Patent: Feb. 14, 2023

(54) OPTICAL COMMUNICATION CONNECTOR, OPTICAL COMMUNICATION CABLE, AND ELECTRONIC DEVICE

(71) Applicant: SONY CORPORATION, Tokyo (JP)

(72) Inventor: Masanari Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 165 days.

(21) Appl. No.: 16/763,433

(22) PCT Filed: Dec. 7, 2018

(86) PCT No.: PCT/JP2018/045031
§ 371 (c)(1),
(2) Date: May 12, 2020

(87) PCT Pub. No.: WO2019/124110
PCT Pub. Date: Jun. 27, 2019

(65) Prior Publication Data
US 2020/0310036 A1    Oct. 1, 2020

(30) Foreign Application Priority Data

Dec. 21, 2017  (JP) .............................. JP2017-244731

(51) Int. Cl.
*G02B 6/32*   (2006.01)
*G02B 6/34*   (2006.01)

(52) U.S. Cl.
CPC ................. *G02B 6/32* (2013.01); *G02B 6/34* (2013.01)

(58) Field of Classification Search
CPC .......... G02B 6/32; G02B 6/42; G02B 6/4214; G02B 6/44; G02B 6/4292; G02B 6/4297; G02B 6/34
See application file for complete search history.

(56) References Cited

U.S. PATENT DOCUMENTS

2011/0064358 A1 * 3/2011 Nishimura ........... G02B 6/4214
385/47
2015/0219863 A1   8/2015 Haase et al.
(Continued)

FOREIGN PATENT DOCUMENTS

CA    2714696 A1    3/2011
CN    1239552 A    12/1999
(Continued)

OTHER PUBLICATIONS

Office Action received in patent application CN 201880073701.4, dated Sep. 17, 2021, pp. 30, 13 pages of office action and 17 pages of translation.

(Continued)

*Primary Examiner* — Michael P Mooney
(74) *Attorney, Agent, or Firm* — Chip Law Group

(57) ABSTRACT

There is provided an optical communication connector, an optical communication cable, and an electronic device that can curb occurrence of a transmission error. The optical communication connector includes a collimating lens that collimates light from multiple optical transmission lines transmitting optical signals, and a refracting portion that refracts and emits light emitted from the collimating lens, in which in the collimating lens, at least some of transmission channels and reception channels corresponding to the multiple optical transmission lines are thinned out. The optical communication connector can be applied to an optical communication system, for example.

6 Claims, 16 Drawing Sheets

(56) References Cited

U.S. PATENT DOCUMENTS

| | | |
|---|---|---|
| 2016/0085030 A1 | 3/2016 | Arao et al. |
| 2016/0341909 A1 | 11/2016 | Childers et al. |
| 2017/0023747 A1 | 1/2017 | Zbinden |
| 2018/0259715 A1 | 9/2018 | Toba et al. |

FOREIGN PATENT DOCUMENTS

| | | | |
|---|---|---|---|
| CN | 1825150 | A | 8/2006 |
| CN | 102023347 | A | 4/2011 |
| CN | 104781709 | A | 7/2015 |
| CN | 105445866 | A | 3/2016 |
| CN | 108351470 | A | 7/2018 |
| EP | 2998771 | A1 | 3/2016 |
| EP | 3358384 | A1 | 8/2018 |
| JP | 2011-059484 | A | 3/2011 |
| JP | 2013-064803 | A | 4/2013 |
| JP | 2015-530628 | A | 10/2015 |
| JP | 2016-061942 | A | 4/2016 |
| KR | 10-2018-0061161 | A | 6/2018 |
| TW | 201619650 | A | 6/2016 |
| TW | M533225 | U | 12/2016 |
| TW | 201704792 | A | 2/2017 |
| TW | 201723551 | A | 7/2017 |
| WO | 2014/055361 | A1 | 4/2014 |
| WO | 2017/014827 | A1 | 1/2017 |
| WO | 2017/015279 | A1 | 1/2017 |
| WO | 2017/056889 | A1 | 4/2017 |
| WO | 2017056889 | A1 | 4/2017 |

OTHER PUBLICATIONS

International Search Report and Written Opinion of PCT Application No. PCT/JP2018/045031, dated Feb. 26, 2012, 08 pages of ISRWO.

\* cited by examiner

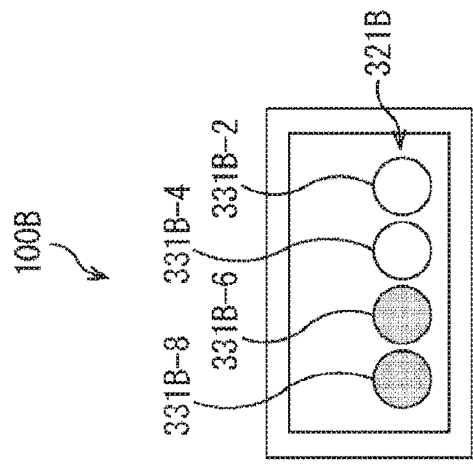
FIG. 12A
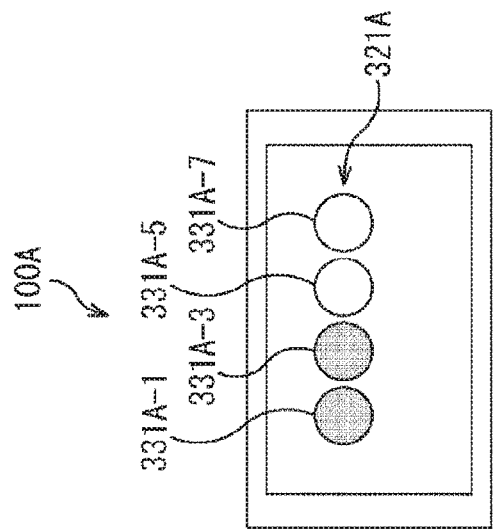
FIG. 12B
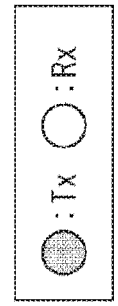

OPTICAL COMMUNICATION CONNECTOR, OPTICAL COMMUNICATION CABLE, AND ELECTRONIC DEVICE

CROSS REFERENCE TO RELATED APPLICATIONS

This application is a U.S. National Phase of International Patent Application No. PCT/JP2018/045031 filed on Dec. 7, 2018, which claims priority benefit of Japanese Patent Application No. JP 2017-244731 filed in the Japan Patent Office on Dec. 21, 2017. Each of the above-referenced applications is hereby incorporated herein by reference in its entirety.

TECHNICAL FIELD

The present technology relates to an optical communication connector, an optical communication cable, and an electronic device, and particularly to an optical communication connector, an optical communication cable, and an electronic device that can curb occurrence of a transmission error.

BACKGROUND ART

In recent years, with an increase in the amount of communication on the Internet and the like, a larger transmission capacity is required. It is becoming difficult to achieve such a large transmission capacity with a conventional transmission method through a copper cable. Therefore, optical communication that can achieve a larger transmission capacity has been proposed.

For example, Patent Document 1 proposes an optical communication connector aimed to prevent laser hazard due to collimated light (parallel light).

CITATION LIST

Patent Document

Patent Document 1: Japanese Patent Application Laid-Open No. 2013-64803

SUMMARY OF THE INVENTION

Problems to be Solved by the Invention

Incidentally, in a case where a refracting portion for refracting and emitting collimated light is provided in a collimating lens that collimates light from an optical transmission line, a condition such as a material used for the refracting portion, an angle of the refracting portion, or surface treatment of the refracting portion may cause light emitted from a transmission channel to generate reflected light on a refraction surface. The reflected light may be mixed into an adjacent reception channel and cause a transmission error. Hence, a technology for curbing occurrence of such a transmission error is required.

The present technology has been made in view of such a situation, and aims to curb occurrence of a transmission error.

Solutions to Problems

An optical communication connector of a first aspect of the present technology is an optical communication connector including a collimating lens that collimates light from multiple optical transmission lines transmitting optical signals and a refracting portion that refracts and emits light emitted from the collimating lens, in which in the collimating lens, at least some of transmission channels and reception channels corresponding to the multiple optical transmission lines are thinned out.

An optical communication cable and an electronic device of the first aspect of the present technology are an optical communication cable and an electronic device corresponding to the above-described optical communication connector of the first aspect of the present technology.

In the optical communication connector, the optical communication cable, and the electronic device of the first aspect of the present technology, at least some of transmission channels and reception channels corresponding to multiple optical transmission lines are thinned out in the collimating lens.

An optical communication connector of a second aspect of the present technology is an optical communication connector including a collimating lens that collimates light from multiple optical transmission lines transmitting optical signals and a refracting portion that refracts and emits light emitted from the collimating lens, in which in the collimating lens, at least some of transmission channels and reception channels corresponding to the multiple optical transmission lines are arranged with a shifted pitch.

An optical communication cable and an electronic device of the second aspect of the present technology are an optical communication cable and an electronic device corresponding to the above-described optical communication connector of the second aspect of the present technology.

In the optical communication connector, the optical communication cable, and the electronic device of the second aspect of the present technology, at least some of transmission channels and reception channels corresponding to multiple optical transmission lines are arranged with a shifted pitch in the collimating lens.

An optical communication connector of a third aspect of the present technology is an optical communication connector including a collimating lens that collimates light from multiple optical transmission lines transmitting optical signals, and a refracting portion that refracts and emits light emitted from the collimating lens, in which the collimating lens is arranged so as to be offset by a predetermined distance from a center of a fitting surface.

An optical communication cable and an electronic device of the third aspect of the present technology are an optical communication cable and an electronic device corresponding to the above-described optical communication connector of the third aspect of the present technology.

In the optical communication connector, the optical communication cable, and the electronic device of the third aspect of the present technology, the collimating lens is arranged so as to be offset by a predetermined distance from the center of the fitting surface.

An optical communication connector of a fourth aspect of the present technology is an optical communication connector that has a collimating lens that collimates light from multiple optical transmission lines transmitting optical signals and a refracting portion that refracts and emits light emitted from the collimating lens, in which in the collimating lens, of transmission channels and reception channels corresponding to the multiple optical transmission lines, only the transmission channels or only the reception channels are arranged adjacent to one another.

An optical communication cable and an electronic device of the fourth aspect of the present technology are an optical communication cable and an electronic device corresponding to the above-described optical communication connector of the fourth aspect of the present technology.

In the optical communication connector, the optical communication cable, and the electronic device of the fourth aspect of the present technology, in the collimating lens, of the transmission channels and the reception channels corresponding to the multiple optical transmission lines, only the transmission channels or only the reception channels are arranged adjacent to one another.

Note that the optical communication connector of the first to fourth aspects of the present technology described above, or the electronic device of the first to fourth aspects of the present technology may be an independent device, or may be an internal block included in one device.

Effects of the Invention

According to the first to fourth aspects of the present technology, it is possible to curb occurrence of a transmission error.

Note that the effect described herein is not necessarily limited, and the effect may be any of those described in the present disclosure.

BRIEF DESCRIPTION OF DRAWINGS

FIGS. 12A and 12B are lens front view of the collimating lens of the third embodiment.

MODE FOR CARRYING OUT THE INVENTION

Hereinafter, embodiments of the present technology will be described with reference to the drawings. Note that the description will be given in the following order.
 1. First embodiment: Configuration with specific channels thinned out
 2. Second embodiment: Configuration with shifted pitch
 3. Third embodiment: Configuration in which collimating lens is offset
 4. Fourth embodiment: Configuration in which only specific channels are arranged adjacently
 5. Fifth Embodiment: Configuration in which antireflection portion is provided in refracting portion
 6. Modification
 7. Example of application to movable body 1. First Embodiment (Configuration of Electronic Device and Optical Communication Cable)

Figure 1:
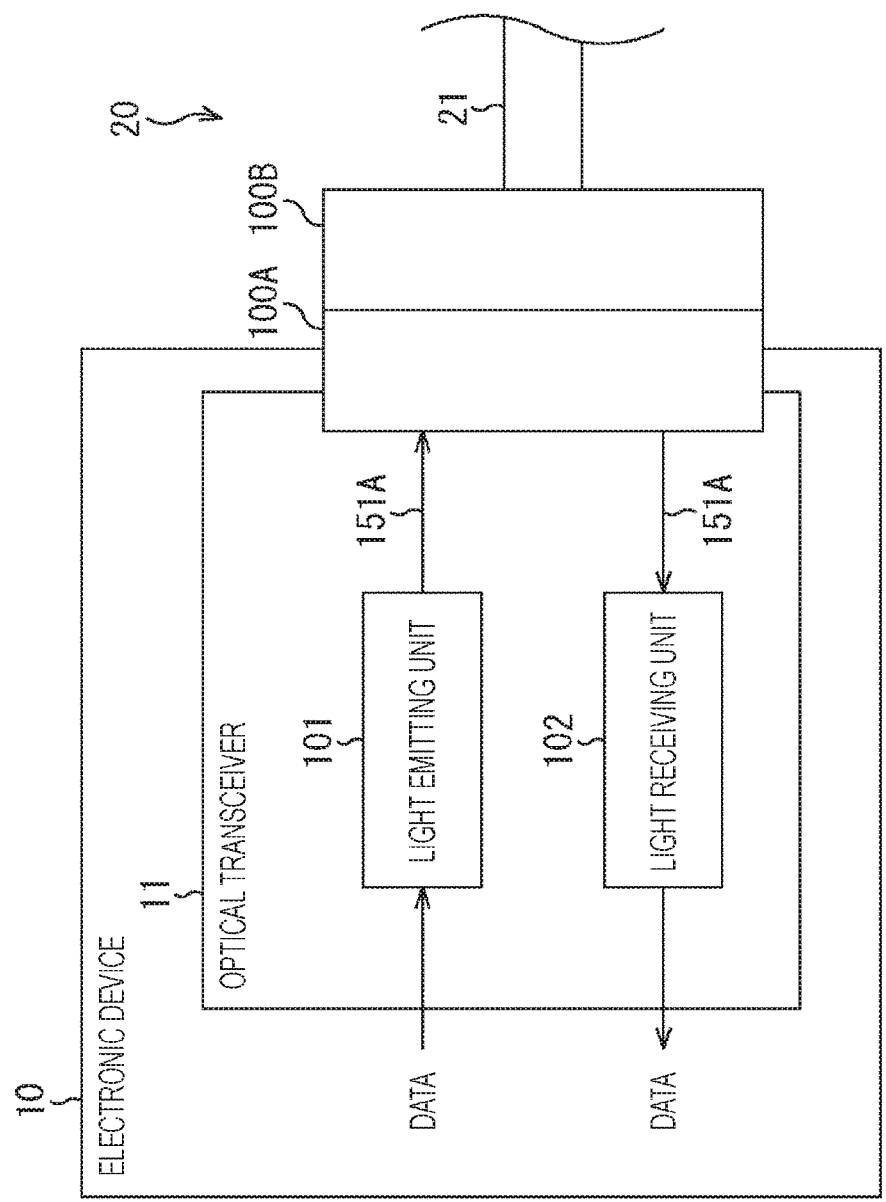
FIG. 1 is a block diagram showing an example of a configuration of an electronic device and an optical communication cable to which a technology according to the present disclosure is applied.

FIG. 1 shows an example of a configuration of an electronic device and an optical communication cable to which a technology according to the present disclosure is applied.

In FIG. 1, an electronic device 10 includes an optical transceiver 11 capable of optical communication. The optical transceiver 11 includes an optical communication connector 100A, a light emitting unit 101, and a light receiving unit 102.

The optical transceiver 11 can transmit data to be transmitted as an optical signal by the light emitting unit 101 and receive data to be received as an optical signal by the light receiving unit 102 through the optical communication connector 100A.

An optical communication cable 20 includes a cable main body 21 and an optical communication connector 100B. The optical communication cable 20 transmits optical signals between the electronic device 10 and another electronic device or a communication network such as the Internet through the cable main body 21 and the optical communication connector 100B.

(Detailed Configuration of Optical Communication Connector)

Next, a detailed configuration of the optical communication connector 100A and the optical communication connector 100B shown in FIG. 1 will be described with reference to FIGS. 2 to 6.

Figure 2:
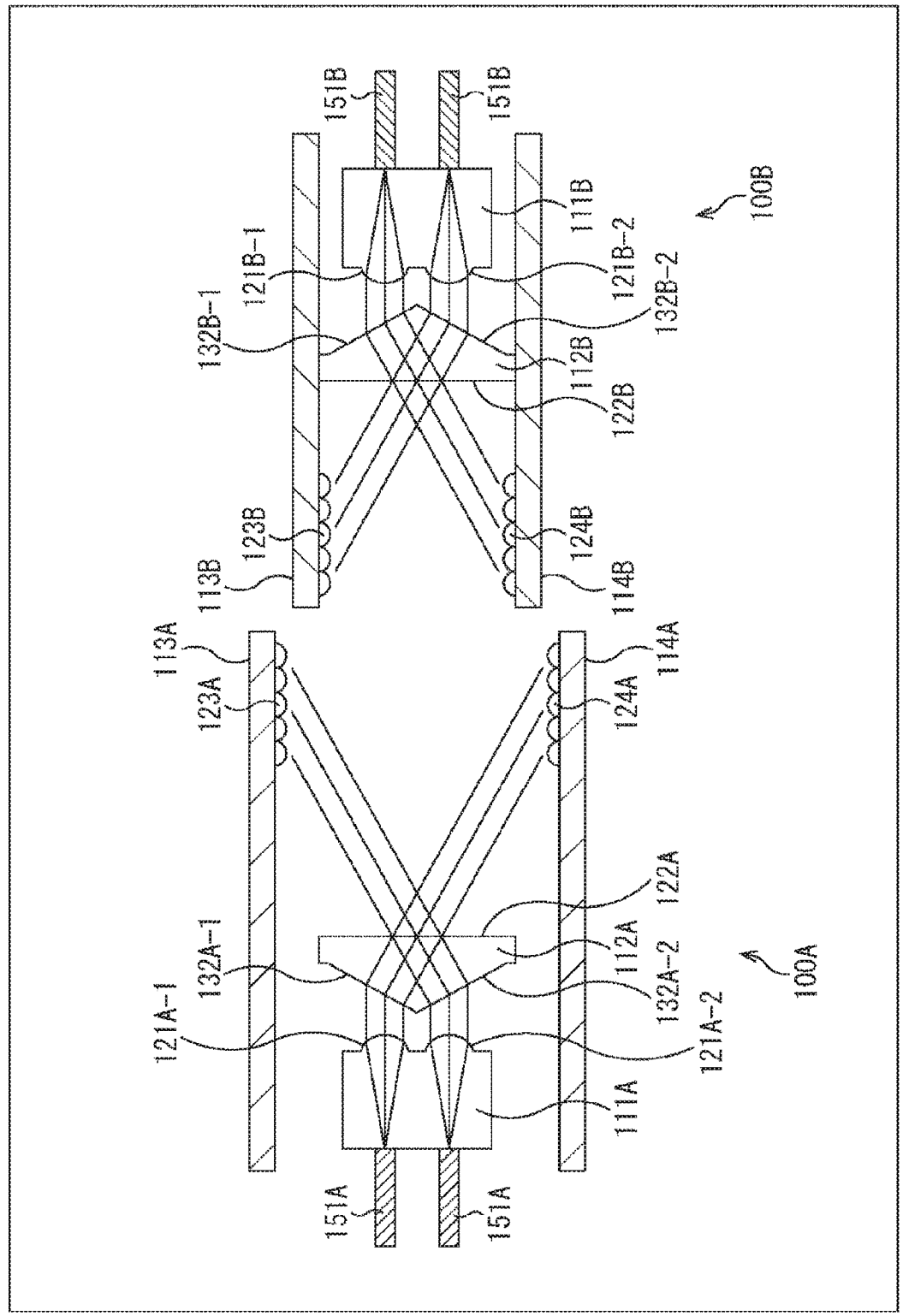
FIG. 2 is an enlarged sectional view of an optical communication connector.
Figure 3:
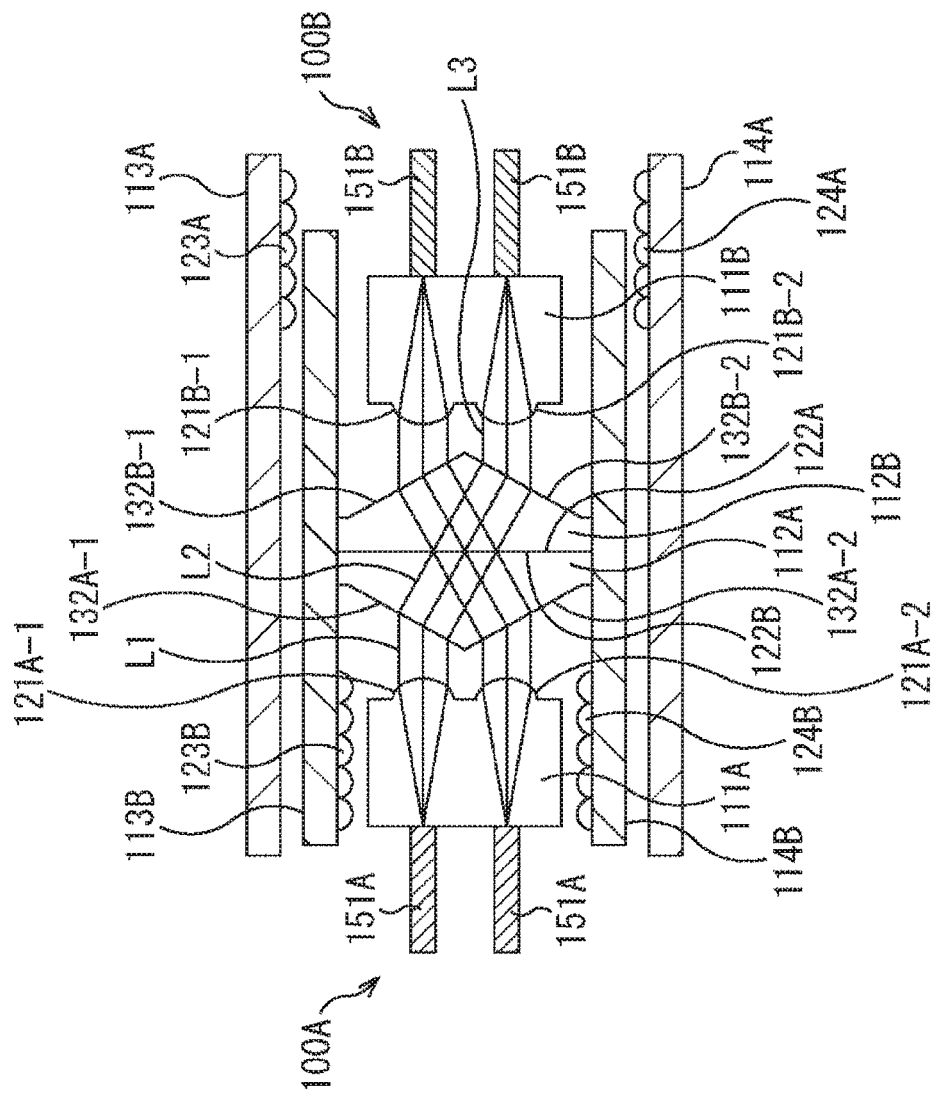
FIG. 3 is an enlarged sectional view of the optical communication connector.
Figure 4:
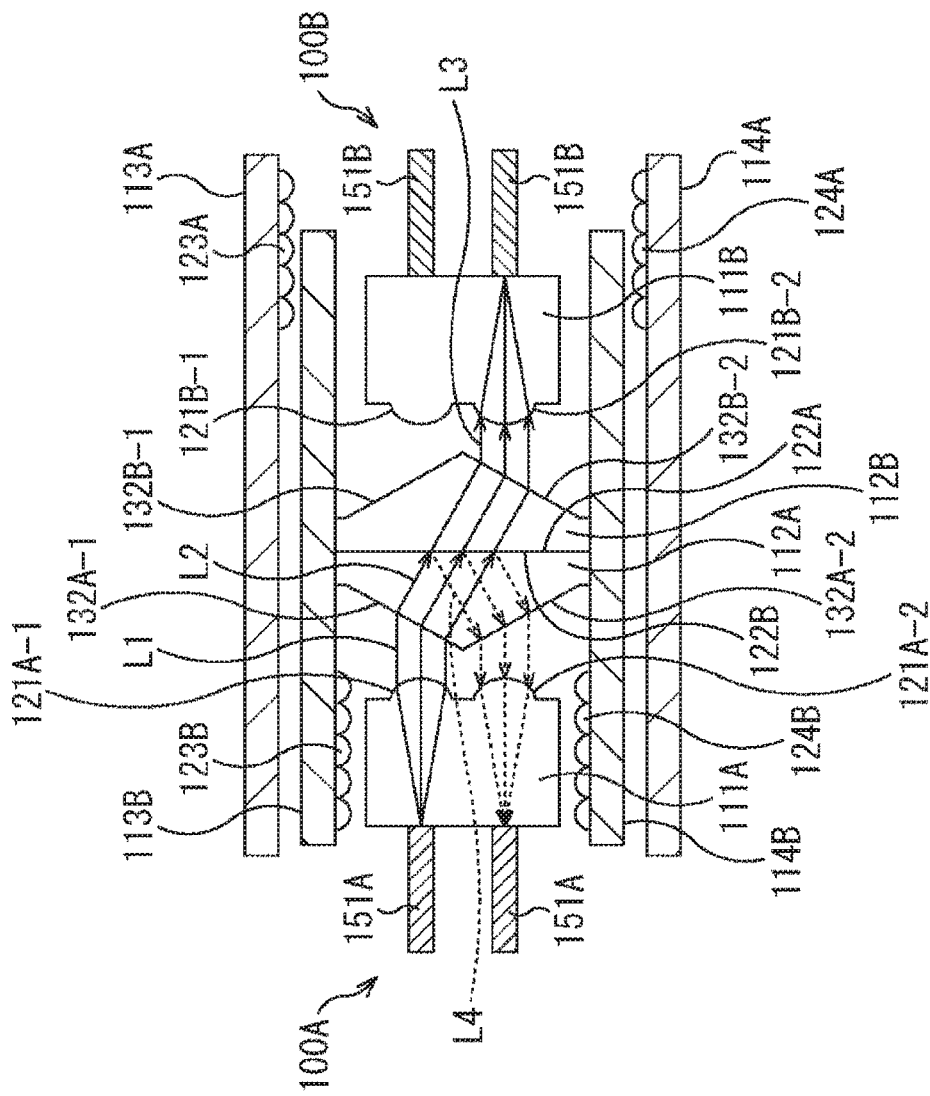
FIG. 4 is an enlarged sectional view of the optical communication connector.

Note that FIG. 2 is an enlarged sectional view showing a state before connection of an optical communication connector 100 of a first embodiment. Additionally, FIGS. 3 and 4 are enlarged sectional views showing a connected state of the optical communication connector 100 of the first embodiment.

In FIG. 2, the optical communication connector 100A is a receptacle disposed on a side surface of the electronic device 10, for example. The optical communication connector 100A mainly has a lens portion 111A, a refracting portion 112A, a scattering member 113A, and a scattering member 114A.

The lens portion 111A is disposed so as to abut on the tip end side of an optical transmission line 151A provided in the optical transceiver 11.

The lens portion 111A converts light of an optical signal emitted from the optical transmission line 151A into parallel light (collimated light) by the collimating lenses 121A-1 and 121A-2 on the tip end side and emits the parallel light. On the other hand, when parallel light enters the collimating lenses 121A-1 and 121A-2 on the tip end side, the lens portion 111A collects and condenses the parallel light and emits the light toward the optical transmission line 151A.

The refracting portion 112A is a prism configured and arranged to refract and emit parallel light emitted by the collimating lenses 121A-1 and 121A-2 of the lens portion 111A.

The tip end side of the refracting portion 112A, that is, a surface of the refracting portion 112A on the refracted light emission side is formed into a flat surface 122A that is substantially perpendicular to the parallel light emitted by the collimating lens 121A. Additionally, the base end side of the refracting portion 112A, that is, a surface of the refracting portion 112A on the parallel light incident side includes multiple refraction surfaces 132A-1 and 132A-2 having different incident angles with respect to the parallel light.

In the refracting portion 112A, the parallel light from the collimating lenses 121A-1 and 121A-2 is refracted by the refraction surfaces 132A-1 and 132A-2 to form refracted light, and is emitted from the flat surface 122A.

The scattering member 113A and the scattering member 114A are plate-shaped members arranged with the refracting portion 112A interposed therebetween. The scattering member 113A and the scattering member 114A are arranged such that a surface on the tip end side thereof faces one of the refraction surfaces 132A-1 and 132A-2 of the refracting portion 112A, so that the surface is irradiated with refracted light having passed through the refracting portion 112A.

Here, the scattering member 113A has a scattering portion 123A that scatters refracted light at a portion that is irradiated with the refracted light. Similarly, the scattering member 114A, too, has a scattering portion 124A that scatters refracted light.

With this configuration, as shown in FIG. 2, in a case where the parallel light collimated by the collimating lens 121A is not connected to the optical communication connector 100B, the parallel light is scattered by the scattering portion 123A and the scattering portion 123B. As a result, it is possible to prevent the collimated parallel light and refracted light from being unintentionally emitted directly to the outside of the optical communication connector 100A.

On the other hand, in FIG. 2, the optical communication connector 100B is a plug provided on the tip end side of the cable main body 21, for example. The optical communication connector 100B mainly has a lens portion 111B, a refracting portion 112B, a scattering member 113B, and a scattering member 114B.

The optical communication connector 100B has a substantially similar configuration as the optical communication connector 100A described above. That is, the lens portion 111B and the refracting portion 112B have a substantially similar configuration as the lens portion 111A and the refracting portion 112A.

Additionally, in order to allow insertion of tip end portions of the scattering members 113B and 114B between the scattering members 113A and 114A and the lens portion 111A and refracting portion 112A when connecting the optical communication connectors 100A and 100B, a gap is provided between the scattering members 113A and 114A and the lens portion 111A and refracting portion 112A.

Then, as shown in FIG. 3, at the time of connection, the optical communication connectors 100A and 100B are arranged such that the refracting portions 112A and 112B are symmetrical and the flat surfaces 122A and 122B face each other.

In this case, first, light emitted from the optical transmission line 151A is collimated by the collimating lenses 121A-1 and 121A-2 of the lens portion 111A to form parallel light L1. Then, the parallel light L1 enters the refracting portion 112A and is refracted by the refraction surfaces 132A-1 and 132A-2 to form refracted light L2.

As a result, the refracted light L2 passes through the flat surface 122A and enters the refracting portion 112B from the flat surface 122B. The refracted light L2 having entered the refracting portion 112B is refracted again by refraction surfaces 132B-1 and 132B-2 to form parallel light L3. The parallel light L3 is collected and condensed by collimating lenses 121B-1 and 121B-2 of the lens portion 111B, and is conveyed to an optical transmission line 151B.

Similarly, light emitted from the optical transmission line 151B is collimated by the collimating lenses 121B-1 and 121B-2 of the lens portion 111B to form parallel light L3. Then, the parallel light L3 enters the refracting portion 112B and is refracted by the refraction surfaces 132B-1 and 132B-2 to form refracted light L2.

As a result, the refracted light passes through the flat surface 122B and enters the refracting portion 112A from the flat surface 122A. The refracted light L2 having entered the refracting portion 112A is refracted again by the refraction surfaces 132A-1 and 132A-2 to form parallel light L1. The parallel light L1 is collected and condensed by the collimating lenses 121A-1 and 121A-2 of the lens portion 111A, and is conveyed to the optical transmission line 151A.

As described above, optical signals can be transmitted bidirectionally between the electronic device 10 and the optical communication cable 20 through the optical communication connectors 100A and 100B.

Additionally, since the optical communication connectors 100A and 100B adopt the refracting portions 112A and 112B for refracting light from the optical transmission lines 151A and 151B, and the scattering members 113A and 114A for scattering at least a part of light emitted from the refracting portions 112A and 112B, the optical communication connectors 100A and 100B have excellent maintainability such as ease in cleaning, and can prevent light from being emitted directly to the outside of the optical communication connectors 100A and 100B (light leakage) even when optical coupling is not performed.

Here, take note of the parallel light (collimated light) emitted from the upper collimating lens 121A-1 of the lens portion 111A. As shown in FIG. 4, the parallel light L1 enters the refraction surface 132A-1 of the refracting portion 112A, and forms refracted light L2 having a certain refraction angle.

The refracted light L2 is emitted from the flat surface 122A of the refracting portion 112A, enters the flat surface 122B of the opposite refracting portion 112B, is refracted again by the refraction surface 132B-2 and enters the lower collimating lens 121B-2 of the lens portion 111B as parallel light L3. As a result, optical transmission from the optical communication connector 100A side to the optical communication connector 100B side is performed.

On the other hand, as shown in FIG. 4, on the flat surface 122A of the refracting portion 112A, reflected light L4 as indicated by a dotted line in FIG. 4 occurs, and after the reflected light L4 is refracted by the other refraction surface 132A-2, the reflected light L4 enters the collimating lens 121A-2 of the lens portion 111A. That is, a certain channel interferes with an adjacent channel by reflection in the refracting portion 112A, which is a prism portion having a high transmittance.

Note, however, that whether or not the reflected light L4 enters the adjacent channel depends on conditions such as the material of the refracting portion 112A, the angles of the inclined surfaces of the refraction surfaces 132A-1 and 132A-2, and the surface treatment performed thereon, for example.

Figure 5:
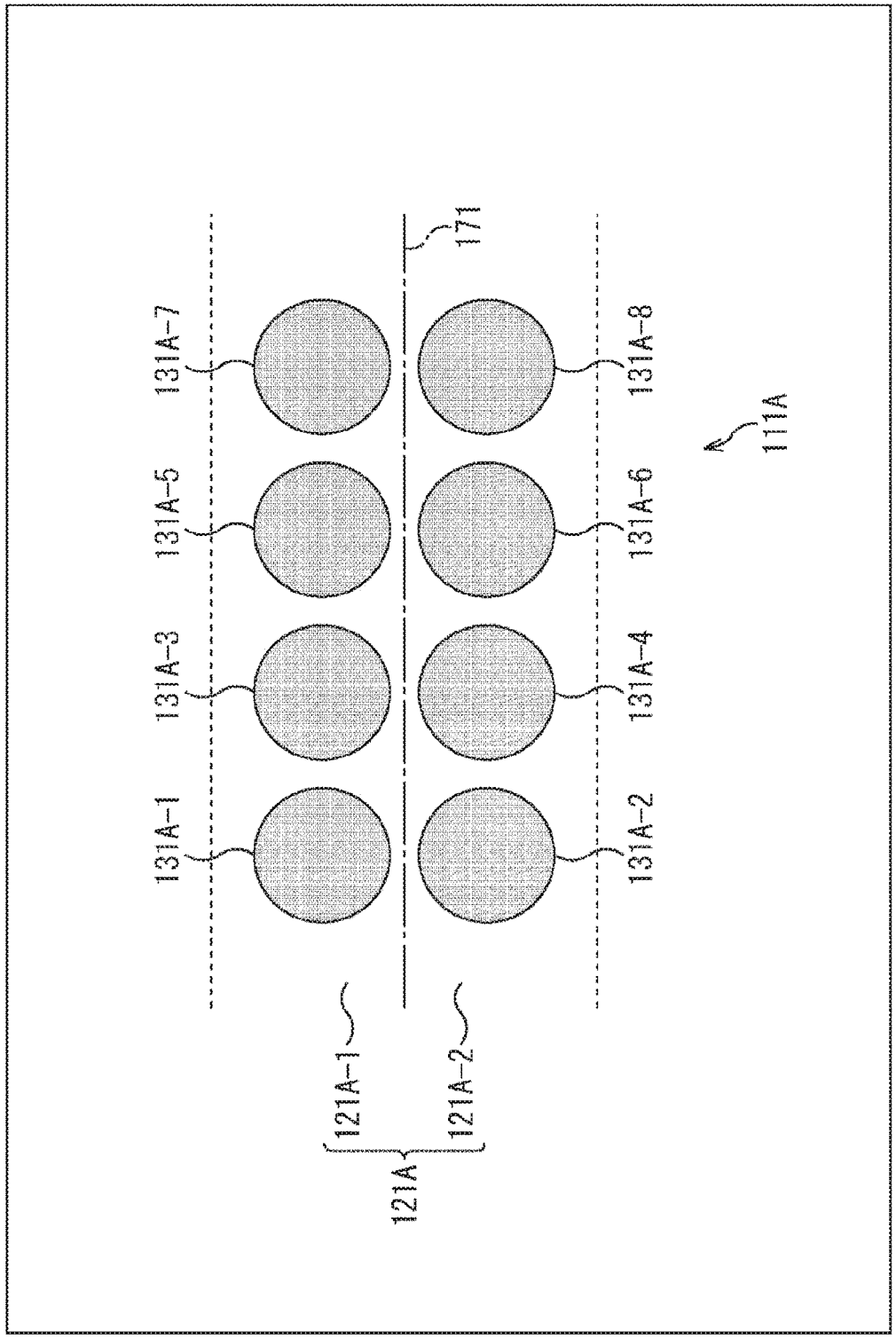
FIG. 5 is a lens front view of a collimating lens.

FIG. 5 shows a lens front view in a case where the collimating lens 121A is viewed from the fitting surface side.

In FIG. 5, upper lenses 131A-1, 131A-3, 131A-5, and 131A-7 indicate lenses arranged in the collimating lens 121A-1 shown in FIG. 4. Additionally, lower lenses 131A-2, 131A-4, 131A-5, and 131A-8 indicate lenses arranged in the collimating lens 121A-2 shown in FIG. 4.

Additionally, in FIG. 5, an alternate long and short dash line drawn on the collimating lens 121A indicates an edge 171 between the inclined surface of the upper refraction surface 132A-1 and the inclined surface of the lower refraction surface 132A-2 of the refracting portion 112A. Note that the edge 171 can also be regarded as an inflection point.

As described above, there may be a case where a part of the parallel light emitted from the upper lens 131A-1 is reflected by the flat surface 122A of the refracting portion 112A and enters the lower lens 131A-2, for example. At this time, in a case where the lens 131A-2 is performing, as a reception channel, an optical transmission different from an optical transmission performed in the lens 131A-1, reflected light from the lens 131A-1 turns into a noise component. For this reason, there is a possibility that the noise component will cause a transmission error and disable optical transmission.

Hence, in the optical communication connectors 100A and 100B of the first embodiment, as the arrangement of the transmission and reception channels in the collimating lenses 121A and 121B, at least some of the transmission channels and reception channels are thinned out, so that reflected light from a different optical transmission does not turn into a noise component, and the occurrence of a transmission error can be curbed. Here, the transmission and reception channels can be arranged in a staggered manner, for example.

Figure 6:
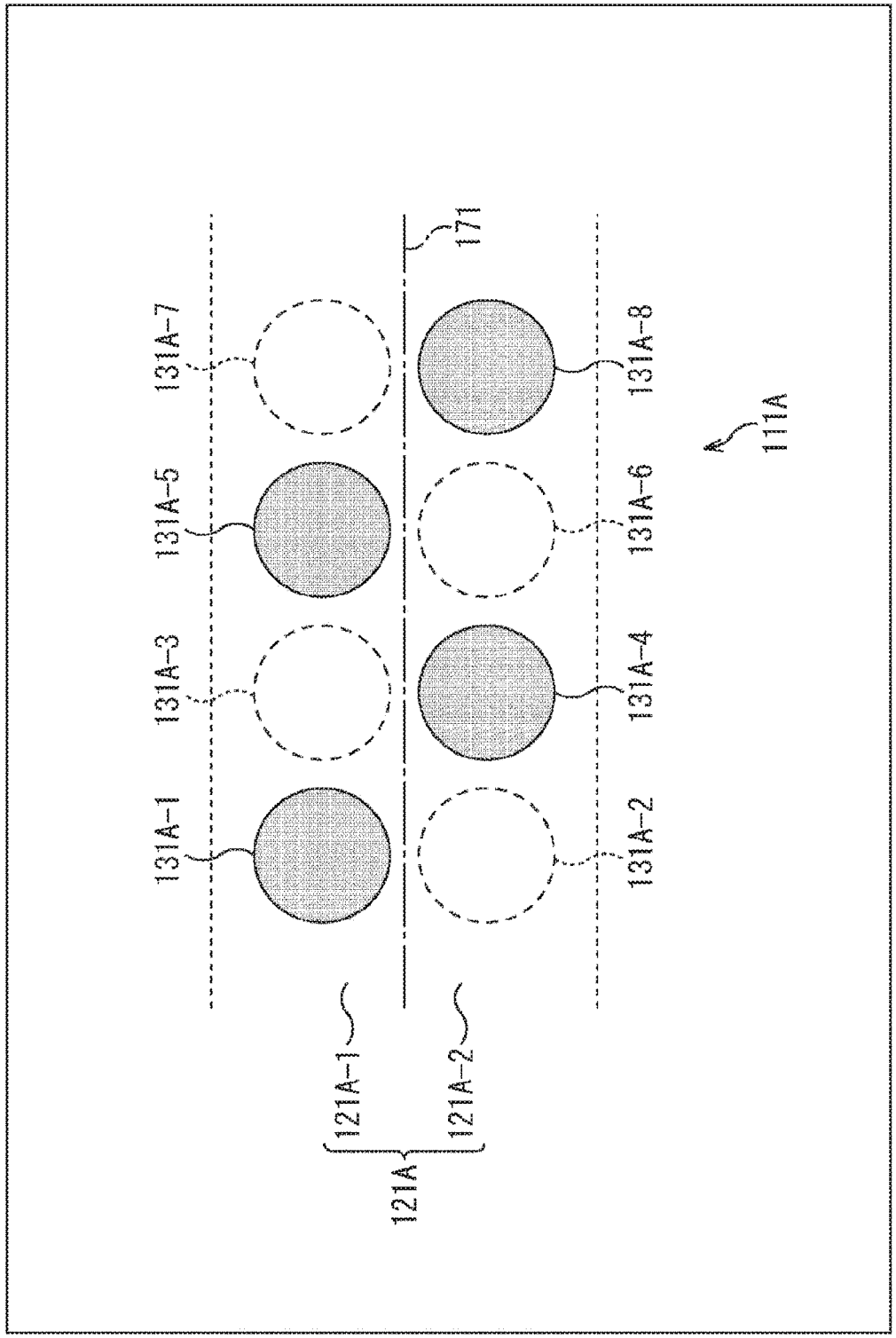
FIG. 6 is a lens front view of a collimating lens of a first embodiment.

That is, for example, as shown in FIG. 6, of the four lenses arranged in the upper stage of the collimating lens 121A, the lenses 131A-1 and 131A-5 are used as transmission channels or reception channels. Additionally, of the four lenses arranged in the lower stage of the collimating lens 121A, the lenses 131A-4 and 131A-8 are used as transmission channels or reception channels.

Note that in the collimating lens 121A, the channels of the upper lenses 131A-3 and 131A-7 and the channels of the lower lenses 131A-2 and 131A-6 are indicated by dotted lines in FIG. 6, which means that the channels are not used for transmission.

By adopting such an arrangement of the transmission and reception channels, even if a part of parallel light L1 emitted from the upper lens 131A-1 enters the lower lens 131A-2 as reflected light L4, for example, since the channel of the lens 131A-2 is not used for optical transmission and the lens 131A-2 is not used for transmission, the reflected light from the lens 131A-2 does not enter the lens 131A-1.

As a result, in the optical communication connectors 100A and 100B of the first embodiment, at the time of connection, it is possible to keep the reflected light from an optical transmission different from the target optical transmission from turning into a noise component in each channel, and perform stable optical transmission without deteriorating a transmission error.

Figure 7:
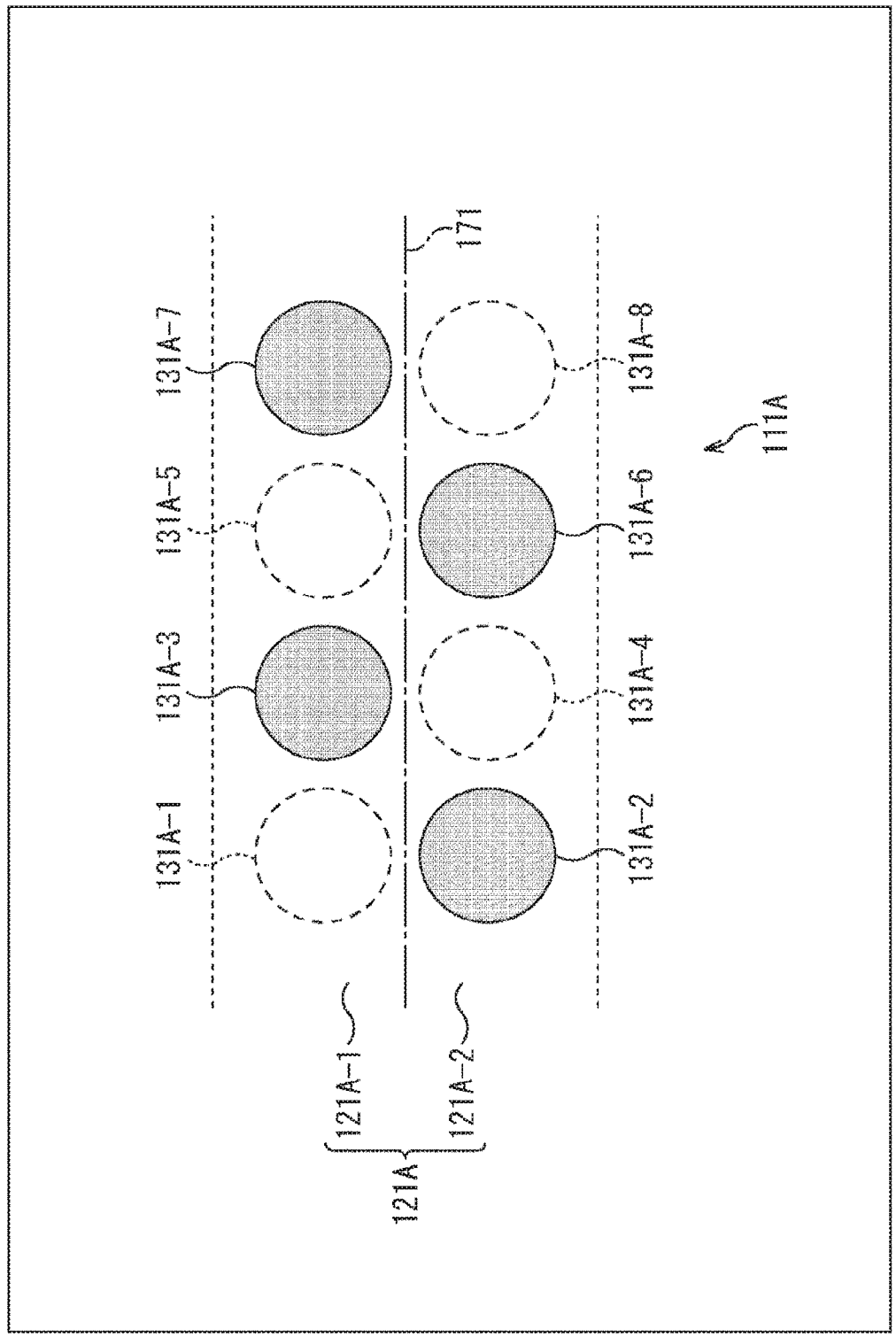
FIG. 7 is a lens front view of the collimating lens of the first embodiment.

Note that as shown in FIG. 7, of the four lenses arranged in the upper stage of the collimating lens 121A, the lenses 131A-3 and 131A-7 may be used as transmission channels or reception channels, and of the four lenses arranged in the lower stage of the collimating lens 121A, the lenses 131A-2 and 131A-6 may be used as transmission channels or reception channels.

Again, in the collimating lens 121A, the channels of the upper lenses 131A-1 and 131A-5 and the channels of the lower lenses 131A-4 and 131A-8 are indicated by dotted lines in FIG. 7, which means that the channels are not used for transmission.

Additionally, although not described, in the optical communication connector 100B of the first embodiment, as similar to the collimating lenses 121A-1 and 121A-2 of the first embodiment described above, the collimating lenses 121B-1 and 121B-2 of the lens portion 111B may be configured such that some of the transmission and reception channels are thinned out by adopting a staggered arrangement or the like, for example.

As described above, in the first embodiment, in the optical communication connectors 100A and 100B, the transmission and reception channels in the collimating lenses 121A and 121B are arranged in a staggered manner or the like, for example, to thin out at least some of the transmission and reception channels. This curbs interference among adjacent channels due to reflected light. As a result, it is possible to keep reflected light from a different optical transmission from turning into a noise component in each channel, and perform stable optical transmission without deteriorating a transmission error.

Additionally, in the optical communication connectors 100A and 100B, by providing the refracting portions 112A and 112B and the scattering members 113A and 114A, maintainability such as ease in cleaning is improved, and even when optical coupling is not performed, light leakage to the outside is prevented. Then, in the optical communication connectors 100A and 100B, not only is maintainability improved and light leakage to the outside is prevented, but also the staggered arrangement or the like of the transmission and reception channels in the collimating lenses 121A and 121B prevents emitted light from a transmission channel from being mixed into a reception channel, even if the light is reflected by (the flat surfaces 122A and 122B of) the refracting portions 112A and 112B. Thus, stable transmission with little transmission error can be achieved.

Here, a condition such as a material used for the refracting portions 112A and 112B, angles of the refraction surfaces 132A (132A-1, 132A-2) and 132B (132B-1, 132B-2) of the refracting portions 112A and 112B, and a surface treatment of the refracting portions 112A and 112B, for example, may cause light emitted from a transmission channel to generate reflected light on the flat surfaces 122A and 122B of the refracting portions 112A and 112B. The reflected light may be mixed into an adjacent reception channel and cause a transmission error, which may disable transmission in some cases. In particular, in a case of performing real-time transmission of video, audio, and the like, for example, a more stable transmission is required.

In response to such a request, the first embodiment adopts a staggered arrangement or the like of the transmission and reception channels in the collimating lenses 121A and 121B to achieve stable transmission with little transmission error even in a case of performing real-time transmission of video, audio, and the like, for example.

2. Second Embodiment

Figure 8:
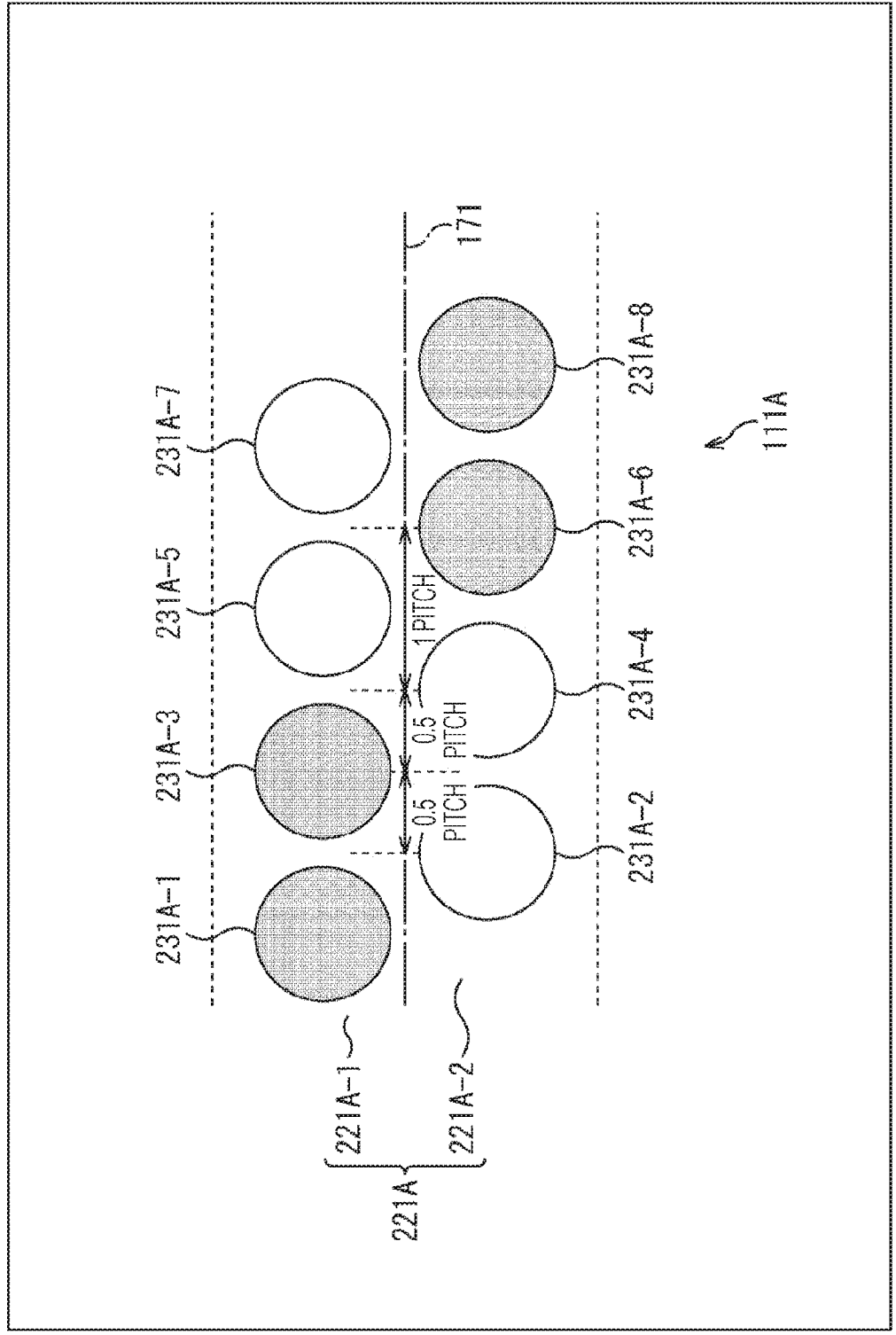
FIG. 8 is a lens front view of a collimating lens of a second embodiment.

FIG. 8 shows a lens front view of a collimating lens in an optical communication connector of a second embodiment.

Note that optical communication connectors 100A and 100B of the second embodiment have a configuration corresponding to the optical communication connectors 100A and 100B of the first embodiment described above, but are different in the configuration of collimating lenses 121A and 121B of lens portions 111A and 111B (e.g., FIG. 2). Accordingly, in the following description of the second embodiment, the expression "collimating lenses 221A and 221B" will be used instead of the collimating lenses 121A and 121B.

In FIG. 8, lenses 231A-1, 231A-3, 231A-5, and 231A-7 are arranged as a collimating lens 221A-1 in the upper stage of the lens portion 111A (e.g., FIG. 2). Additionally, lenses 231A-2, 231A-4, 231A-6, and 231A-8 are arranged as a collimating lens 221A-2 in the lower stage of the lens portion 111A (e.g., FIG. 2).

Here, in the optical communication connector 100A of the second embodiment, as the arrangement of the transmission and reception channels in the collimating lens 221A, at least some of the transmission channels and reception channels are arranged with a shifted pitch, so that reflected light from a different optical transmission does not turn into a noise component, and the occurrence of a transmission error can be curbed. Here, the arrangement of the transmission and reception channels may be shifted by a half pitch, for example.

That is, as shown in FIG. 8, the lenses 231A-2, 231A-4, 231A-6, and 231A-8 arranged in the lower stage of the collimating lens 221A can be arranged so as to be shifted by substantially a half pitch (0.5 pitches) from the lenses 231A-1, 231A-3, 231A-5, and 231A-7 arranged in the upper stage of the collimating lens 221A.

At this time, the upper lenses 231A-1 and 231A-3 and the lower lenses 231A-6 and 231A-8 can be used as transmission channels, for example. On the other hand, the upper lenses 231A-5 and 231A-7 and the lower lenses 231A-2 and 231A-4 can be used as reception channels, for example.

As described above, in the collimating lens 221A, the upper and lower channels, that is, the channels in the odd-numbered row and the channels in the even-numbered row are arranged so as to be shifted by substantially a half pitch (0.5 pitches) in the row direction. Then, by adopting such an arrangement of the transmission and reception channels, it is possible to reduce the amount of reflected light L4 from a flat surface 122A of a refracting portion 112A.

Figure 9:
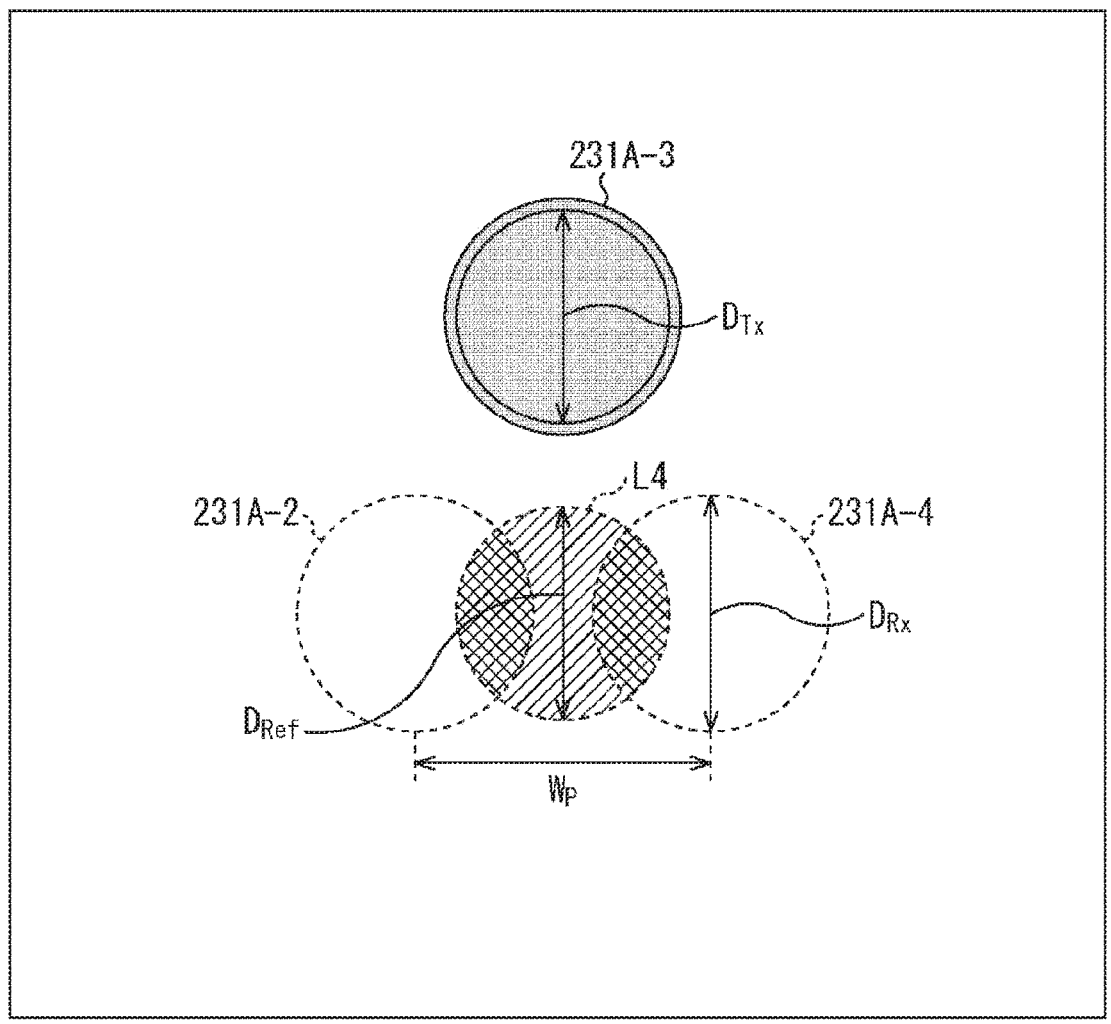
FIG. 9 is a diagram for describing an effect of shifting the pitch of the collimating lens of the second embodiment.

For example, as shown in FIG. 9, parallel light (collimated light) emitted from the upper lens 231A-3 of the collimating lens 221A is reflected by the flat surface 122A of the refracting portion 112A, and the reflected light is emitted to the lower stage of the collimating lens 221A. However, the upper and lower lenses 231A of the collimating lens 221A are arranged so as to be shifted by a half pitch.

For this reason, in the collimating lens 221A, the reflected light L4 is emitted to substantially the middle between the lower lenses 231A-2 and 231A-4 corresponding to the upper lens 231A-3 used as a transmission channel. As a result, in the collimating lens 221A, it is possible to reduce the amount of reflected light L4 entering the lenses 231A-2 and 231A-4 used as reception channels.

Here, the inventors of the technology according to the present disclosure have found that the following relationship is obtained by performing a detailed simulation.

That is, as shown in FIG. 9, for example, in a case where a light diameter (transmission light diameter) of a laser beam emitted from the upper lens 231A-3 used as a transmission channel is $D_{Tx}=1.8$ mm, a lens diameter (reception lens diameter) of the lower lenses 231A-2 and 231A-4 used as reception channels is $D_{Rx}=2.0$ mm, and an inter-lens pitch of the lower lenses 231A-2 and 231A-4 is $W_P=2.5$ mm, assume that the reflected light diameter of the reflected light L4 from the flat surface 122A of the refracting portion 112A is $D_{Ref}=1.8$ mm.

At this time, while the upper lens 231A-3 and the lower lenses 231A-2 and 231A-4 are arranged so as to be shifted by substantially a half pitch, it has been confirmed that the effect of the reflected light L4 entering between the lens 231A-2 and the lens 231A-4 used as a reception channel from the lens 231A-3 used as a transmission channel can be reduced to about 0.5 times compared to the case where the pitch is not shifted.

Note that although not described, in the optical communication connector 100B of the second embodiment, as similar to the collimating lenses 221A-1 and 221A-2 of the second embodiment described above, collimating lenses 221B-1 and 221B-2 of the lens portion 111B may be configured such that the transmission channels and reception channels are arranged with a shifted pitch.

As described above, in the second embodiment, in the optical communication connectors 100A and 100B, the transmission and reception channels in the collimating lenses 221A and 221B are arranged such that the upper and lower channels are shifted by substantially a half pitch (0.5 pitches), for example, to arrange at least some channels with a shifted pitch. This curbs interference among adjacent channels due to reflected light. As a result, it is possible to keep reflected light from a different optical transmission from turning into a noise component in each channel, and perform stable optical transmission without deteriorating a transmission error.

3. Third Embodiment

Figure 10:
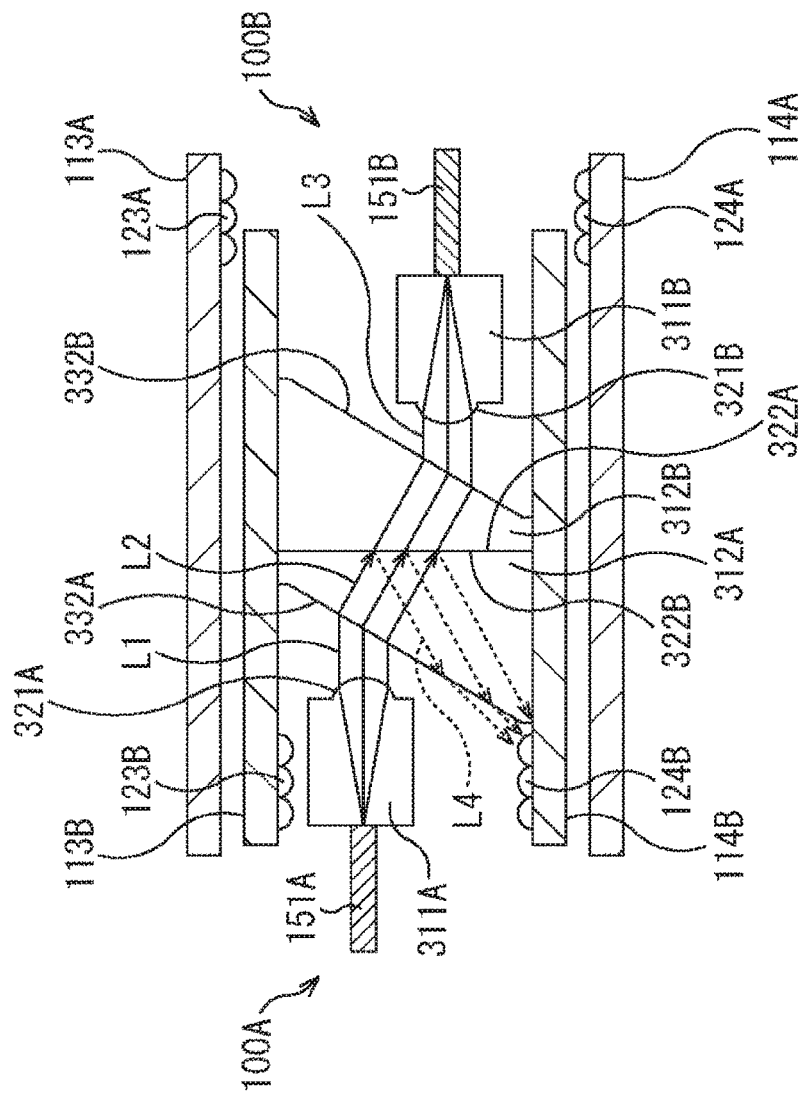
FIG. 10 is an enlarged sectional view of an optical communication connector of a third embodiment.

FIG. 10 is an enlarged sectional view showing a connected state of an optical communication connector of a third embodiment.

The enlarged sectional view showing the connected state in FIG. 10 is different from the enlarged sectional view shown in FIG. 4 in the configuration and arrangement of lens portions 111A and 111B and refracting portions 112A and 112B. Hence, the different points will be mainly described below.

In FIG. 10, an optical communication connector 100A has a lens portion 311A, a refracting portion 312A, a scattering member 113A, and a scattering member 114A.

The lens portion 311A has a collimating lens 321A including multiple lenses arranged in one stage. That is, while the collimating lens 121A of the above-described lens portion 111A (FIG. 4) has multiple lenses arranged in each of two stages, an upper stage and a lower stage, in the collimating lens 321A, the multiple lenses are arranged only in one stage. The thickness of the collimating lens 321A is reduced by the decrease in the number of stages.

Additionally, the collimating lens 321A of the lens portion 311A is arranged so as to be offset to an upper surface side (scattering member 113B side) by a predetermined distance from the center of a fitting surface as compared to the arrangement of the collimating lens 121A of the lens portion 111A (FIG. 4) described above.

Here, it can be said that the fitting surface is a surface where a flat surface 322A of the refracting portion 312A and a flat surface 322B of a refracting portion 312B abut when the optical communication connector 100A and an optical communication connector 100B are connected. That is, the center of the contact surface corresponds to the center of the fitting surface.

The refracting portion 312A is a prism that refracts and emits parallel light emitted by the collimating lens 321A of the lens portion 311A.

A surface of the refracting portion 312A on the refracted light emission side is formed into the flat surface 322A that is substantially perpendicular to the parallel light emitted by the collimating lens 321A. Additionally, in the refracting portion 312A, the surface on the parallel light incident side is a refraction surface 332A that refracts the parallel light.

Here, take note of the parallel light (collimated light) emitted from the collimating lens 321A of the lens portion 311A. As shown in FIG. 10, the parallel light L1 enters the refraction surface 332A of the refracting portion 312A, and forms refracted light L2 having a certain refraction angle.

The refracted light L2 is emitted from the flat surface 322A of the refracting portion 312A, enters the flat surface 322B of the opposite refracting portion 312B, is refracted again by a refraction surface 332B and enters a collimating lens 321B of a lens portion 311B as parallel light L3. As a result, optical transmission from the optical communication connector 100A side to the optical communication connector 100B side is performed.

On the other hand, as shown in FIG. 10, while reflected light L4 as indicated by a dotted line in FIG. 10 is generated on the flat surface 322A of the refracting portion 312A, no refraction surface is provided in the refracting portion 312A and no lens portion 311A is arranged in in the traveling direction of the reflected light L4. Hence, the reflected light L4 generated on the flat surface 322A is not mixed into other optical transmission paths. Hence, stable optical transmission can be performed without deteriorating a transmission error.

Figure 11:
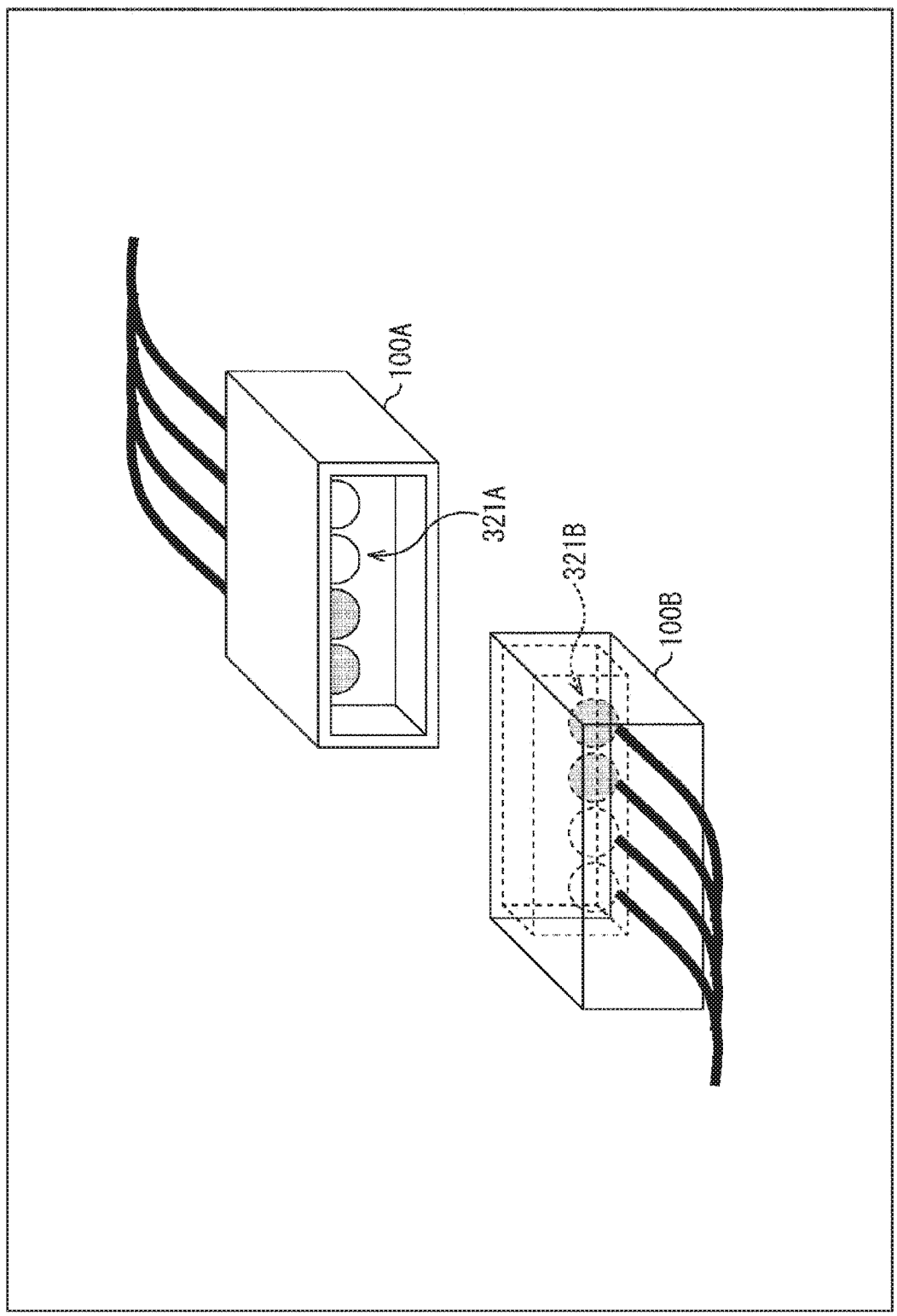
FIG. 11 is a diagram showing an appearance of the optical communication connector of the third embodiment before connection.

Here, FIG. 11 shows an appearance of the optical communication connectors 100A and 100B of the third embodiment shown in FIG. 10 before connection. Additionally, FIGS. 12A and 12B are lens front view when the collimating lenses 321A and 321B of the optical communication connectors 100A and 100B of the third embodiment are viewed from the front.

In the optical communication connector 100A, the collimating lens 321A provided in the rectangular member is arranged so as to be offset to the upper surface side from the center of the fitting surface. Hence, the four lenses arranged in such a collimating lens 321A are arranged at positions slightly above the center of the fitting surface when viewed from the fitting surface. Additionally, of the four lenses, lenses 331A-1 and 331A-3 are used as transmission channels, and lenses 331A-5 and 331A-7 are used as reception channels.

On the other hand, in the optical communication connector 100B, the collimating lens 321B provided in the rectangular member is arranged so as to be offset to the lower surface side from the center of the fitting surface. Hence, the four lenses arranged in such a collimating lens 321B are arranged at positions slightly lower than the center of the fitting surface when viewed from the fitting surface. Additionally, of the four lenses, lenses 331B-2 and 331B-4 are used as reception channels, and lenses 331B-6 and 331B-8 are used as transmission channels.

Note that when the optical communication connectors 100A and 100B are connected, tip end portions of the scattering members 113B and 114B are inserted between scattering members 113A and 114A and the lens portion 111A and refracting portion 112A. Hence, the appearance of the member of the optical communication connector 100A is slightly larger than that of the member of the optical communication connector 100B.

By adopting such a configuration, when the optical communication connectors 100A and 100B are connected, the lens 331A-1 of the collimating lens 321A and the lens 331B-2 of the collimating lens 321B form corresponding transmission and reception channels, and optical transmission Is performed. Similarly, the lens 331A-3 and the lens 331B-4, the lens 331B-6 and the lens 331A-5, and the lens 331B-8 and the lens 331A-7 form corresponding transmission and reception channels, and optical transmission is performed.

As described above, in the third embodiment, in the optical communication connectors 100A and 100B, the collimating lenses 321A and 321B are offset toward the end of the upper surface or the lower surface by a predetermined distance from the center of the fitting surface, and are aligned with each other. This curbs interference among adjacent channels due to reflected light. As a result, it is possible to keep reflected light from a different optical transmission from turning into a noise component in each channel, and perform stable optical transmission without deteriorating a transmission error.

4. Fourth Embodiment

Figure 13:
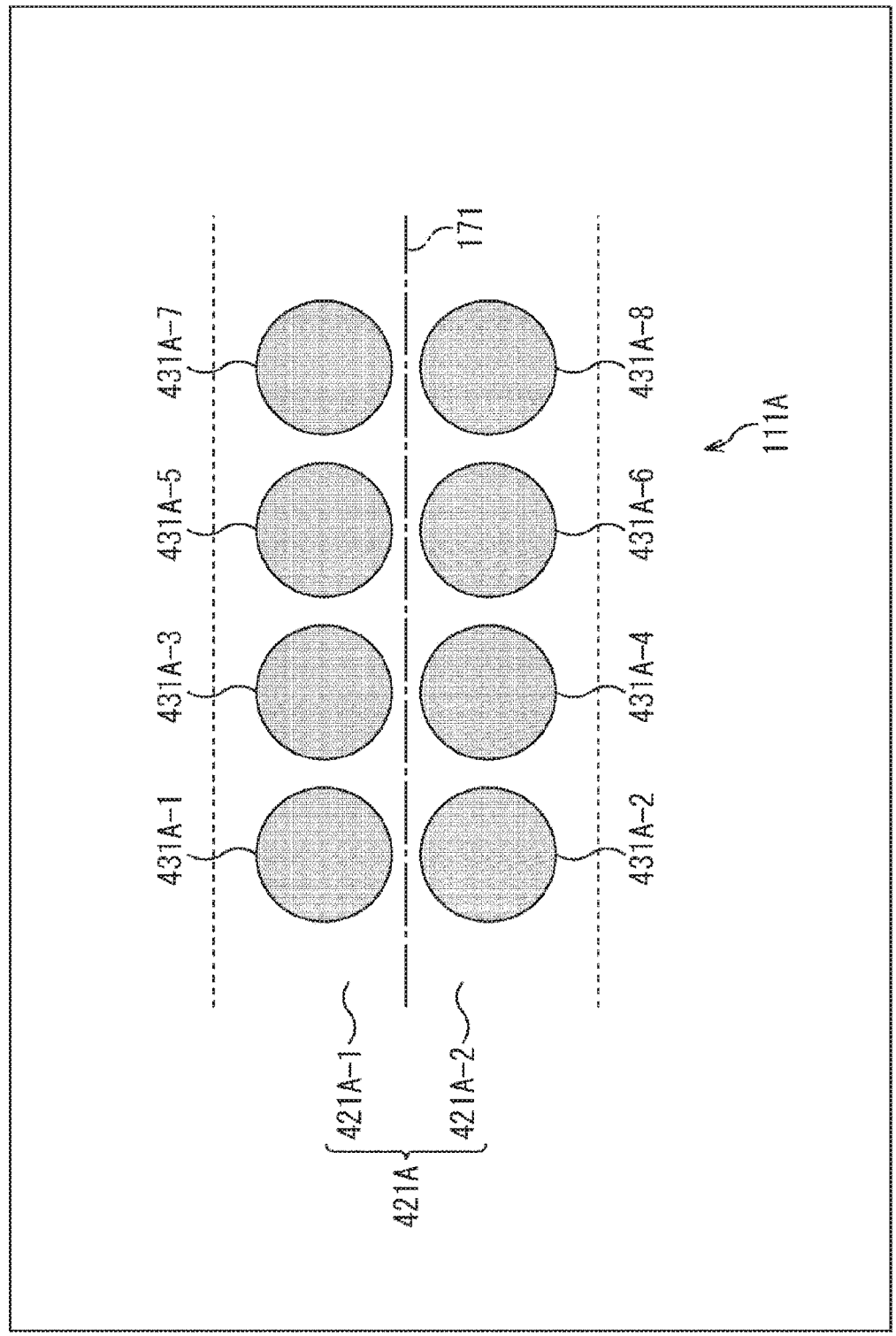

FIG. 13 shows a lens front view of a collimating lens in an optical communication connector of a fourth embodiment.

Note that optical communication connectors 100A and 100B of the fourth embodiment have a configuration corresponding to the optical communication connectors 100A and 100B of the first embodiment described above, but are different in the configuration of collimating lenses 121A and 121B of lens portions 111A and 111B (e.g., FIG. 2). Accordingly, in the following description of the fourth embodiment, the expression "collimating lenses 421A and 421B" will be used instead of the collimating lenses 121A and 121B.

Here, in the optical communication connector 100A of the fourth embodiment, as the arrangement of the transmission and reception channels in the collimating lens 421A, of the transmission channels and the reception channels, only transmission channels or only reception channels are arranged adjacent to one another, so that reflected light from a different optical transmission does not turn into a noise component, and the occurrence of a transmission error can be curbed.

Here, for example, instead of providing a transmission channel and a reception channel in a mixed manner in lenses 431A that are paired with an edge 171 interposed therebetween, only transmission channels or only reception channels are arranged as channels having the same function. With this configuration, it is possible to curb entry of reflected light L4, which is generated when parallel light emitted from a transmission channel is reflected by the flat surface 122A of the refracting portion 112A, into a reception channel.

That is, as shown in FIG. 13, lenses 431A-1, 431A-3, 431A-5, and 431A-7 arranged in the upper stage of the collimating lens 421A, and lenses 431A-2, 431A-4, 431A-6, and 431A-8 arranged in the lower stage of the collimating lens 421A are arranged to be channels of the same function.

Here, for example, in a case where the upper lens 431A (e.g., lens 431A-1) is used as a transmission channel, the lower lens 431A (e.g., lens 431A-2) is used as a transmission channel. Additionally, for example, in a case where the upper lens 431A (e.g., lens 431A-1) is used as a reception channel, the lower lens 431A (e.g., lens 431A-2) is used as a reception channel.

Note that although not described, in the optical communication connector 100B of the fourth embodiment, as similar to the collimating lenses 421A-1 and 421A-2 of the fourth embodiment described above, collimating lenses 421B-1 and 421B-2 of the lens portion 111B may be configured such that only transmission channels or only reception channels are arranged adjacent to one another.

As described above, in the fourth embodiment, in the optical communication connectors 100A and 100B, the transmission and reception channels in the collimating lenses 421A and 421B are arranged such that only transmission channels are arranged adjacent to one another, for example, to arrange only transmission channels or only reception channels adjacent to one another. This curbs interference among adjacent channels due to reflected light. As a result, it is possible to keep reflected light from a different optical transmission from turning into a noise component in each channel, and perform stable optical transmission without deteriorating a transmission error.

5. Fifth Embodiment

Figure 14:
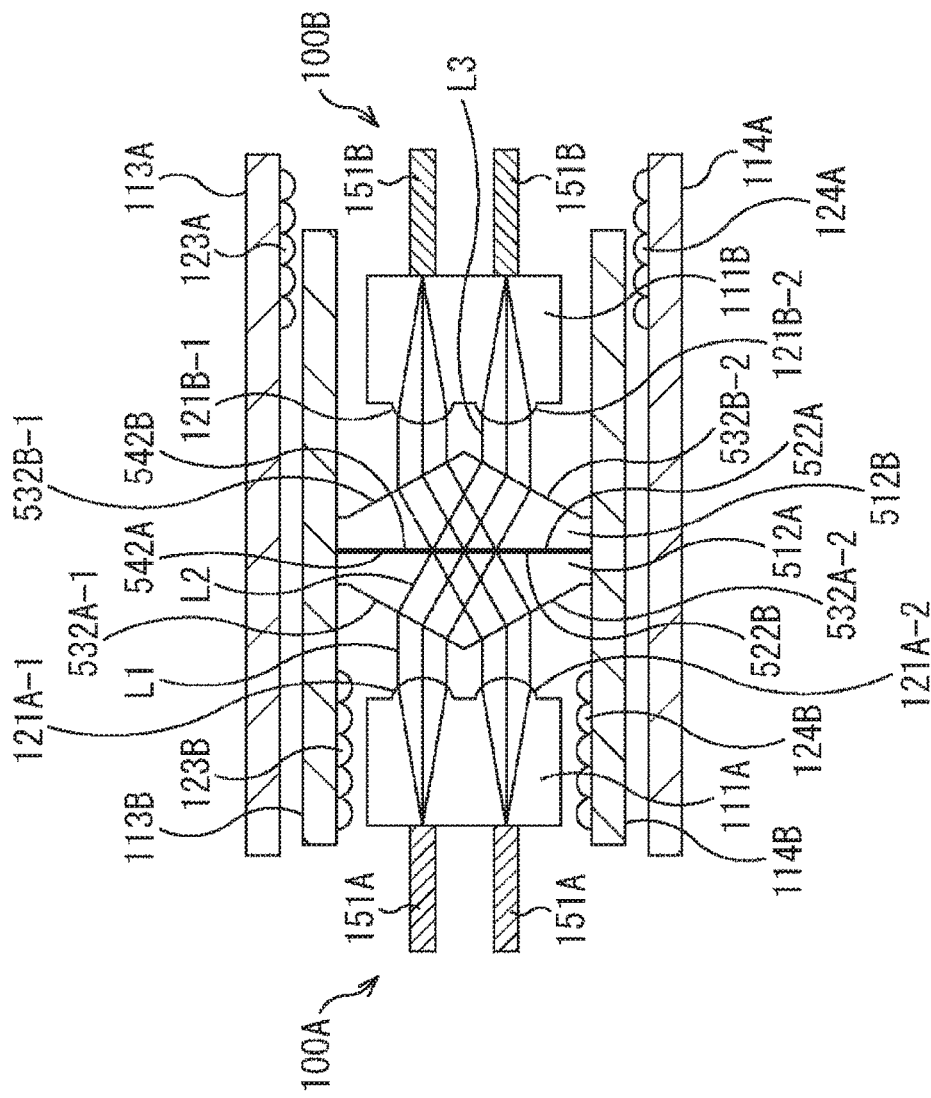

FIG. 14 is an enlarged sectional view showing a connected state of an optical communication connector of a fifth embodiment.

The enlarged sectional view showing the connected state in FIG. 14 is different from the enlarged sectional view shown in FIG. 3 in the configuration of the refracting portions 112A and 112B. Hence, the different points will be mainly described below.

In FIG. 14, an optical communication connector 100A has a lens portion 111A, a refracting portion 512A, a scattering member 113A, and a scattering member 114A.

The refracting portion 512A is a prism that refracts and emits parallel light emitted by a collimating lens 121A of the lens portion 111A.

A surface of the refracting portion 512A on the refracted light emission side is formed into a flat surface 522A that is substantially perpendicular to the parallel light emitted by the collimating lens 121A. Additionally, in the refracting portion 512A, the surface on the parallel light incident side has refraction surfaces 532A-1 and 532A-2 that refract the parallel light.

Here, in the refracting portion 512A, an antireflection portion 542A is formed on the flat surface 522A. By providing the antireflection portion 542A, reflection on the flat surface 522A can be reduced, and interference with an adjacent channel due to reflected light L4 can be curbed. Note that an antireflection portion 542B can also be formed on a flat surface 522B in a refracting portion 512B.

The antireflection portions 542A and 542B can be implemented by using, other than an antireflection film, a fine uneven structure such as a moth-eye structure or the like, for example.

As described above, in the fifth embodiment, in the optical communication connectors 100A and 100B, the antireflection portions 542A and 542B such as an antireflection film are formed on the flat surfaces 522A and 522B (surface of prism portion having high transmittance) of the refracting portions 512A and 512B, for example. Thus, reflection on the flat surfaces 522A and 522B is reduced, and interference among adjacent channels due to reflected light is curbed.

6. Modification

While the optical communication connector 100A is provided in the electronic device 10 and the optical communication connector 100B is provided in the optical communication cable 20 in the above-described embodiments, the arrangement of the optical communication connectors 100A and 100B is not limited thereto. For example, the optical communication connector 100A may be provided in the optical communication cable 20, and the optical communication connector 100B may be provided in the electronic device 10.

As the electronic device 10 of FIG. 1, mobile devices such as a mobile phone and a smartphone, computers such as a personal computer, a tablet computer, and a game machine, network devices such as a router, a switch, a hub, and an optical network unit (ONU), or electronic devices such as a display device, a television receiver, a smart speaker, and a dedicated console device may be used, for example. Moreover, the electronic device 10 may be included in an electric appliance such as a refrigerator, a washing machine, a clock, an intercom, an air conditioner, a humidifier, an air purifier, or a lighting fixture, or a part or whole vehicle as described below with reference to FIGS. 15 and 16, for example.

Note that while the optical communication connector 100A in the above-described embodiments is described as mainly having the lens portion 111A, the refracting portion 112A, the scattering member 113A, and the scattering member 114A, other conceivable configurations may include, as appropriate, a positioning member for positioning each member, a protection member for protecting each member, a casing for holding each member, or the like, for example. Note that similar configurations are applicable to the optical communication connector 100B.

Additionally, while two collimating lenses 121A-1 and 121A-2 are described as the collimating lens 121A formed in the lens portion 111A in the optical communication connector 100A, in the above-described embodiments, the lens portion 111A may include one or more arbitrary number of collimating lenses depending on the number of optical transmission lines 151A.

For example, the lens portion 111A may be a microlens array in which collimating lenses are arranged in the thickness direction and in the width direction of the optical communication connector 100A. Here, for example, the lens portion 111A may be a microlens array in which two rows of collimating lenses are arranged in the thickness direction (vertical direction in the drawing) and multiple rows of collimating lenses are arranged in the width direction (depth direction in the drawing).

Note that in a case where three or more collimating lenses are arranged in the thickness direction or only one collimating lens is arranged in the lens portion 111A, for example, the refracting portion 112A may be correspondingly extended or shortened in the thickness direction.

Additionally, the shape of the refracting portion 112A is not limited to the illustrated shape as long as it can refract parallel light from the collimating lenses 121A-1 and 121A-2. Moreover, the number of refraction surfaces of the refracting portion 112A can be one or more, for example, according to the number of optical signals received from the collimating lens. Note that similar configurations are applicable to the optical communication connector 100B.

Moreover, in the optical communication connector 100A, examples of the material of the refracting portion 112A include a transparent resin material such as polycarbonate, a glass material such as BK7, synthetic quartz, anhydrous synthetic quartz, alkali aluminosilicate, and other transparent inorganic materials. Note, however, that polycarbonate is particularly excellent in mechanical strength, workability, and transparency, and is suitable as the material of the refracting portion 112A.

Additionally, in the optical communication connector 100A, the scattering portions 123A and 124A are not particularly limited as long as they scatter light. For example, a rough surface, a porous film such as an alumite layer, or the like can be used. In particular, the alumite layer can be formed easily and inexpensively, and is excellent in light scattering.

Additionally, the material included in the scattering members 113A and 114A is not particularly limited, and a metal material or the like can be used, for example. For example, in a case where the scattering portions 123A and 124A are an alumite layer, the scattering members 113A and 114A can include aluminum. Similar materials can be used for the optical communication connector 100B (refracting portion 112B, scattering members 113B and 114B, and scattering portions 123B and 124B).

Additionally, in the description of the above embodiments, the flat surface 122A of the refracting portion 112A and the flat surface 122B of the refracting portion 112B come into contact with each other when the optical communication connector 100A and the optical communication connector 100B are connected. However, the invention is not limited to this. For example, the flat surface 122A of the refracting portion 112A and the flat surface 122B of the refracting portion 112B may be separated from each other when the optical communication connector 100A and the optical communication connector 100B are connected. In this case, the optical paths in the refracting portions 112A and 112B may be appropriately adjusted by appropriately adjusting the inclination angles of the refraction surfaces 132A-1 and 132A-2 and the refraction surfaces 132B-1 and 132B-2.

Moreover, in the description of the above embodiment, the scattering portions 123A and 124A of the optical communication connector 100A and the scattering portions 123B and 124B of the optical communication connector 100B scatter all of the refracted light. However, the invention is not limited to this. For example, the scattering portions 123A and 124A and the scattering portions 123B and 124B may be configured to scatter only a part of the refracted light. For example, the degree to which refracted light is scattered by the scattering portions 123A and 124A and the scattering portions 123B and 124B can be adjusted as appropriate to meet the international standard (IEC 60825-1, 2) that regulates the safety of laser products.

Note that while the above fifth embodiment describes a case where the antireflection portions 542A and 542B such as an antireflection film are formed on the flat surfaces 522A and 522B of the refracting portions 512A and 512B (tip end side: light emission side), the present invention is not limited to this. For example, an antireflection portion such as an antireflection film may be formed on the refraction surfaces 532A-1 and 532A-2 and the refraction surfaces 532B-1 and 532B-2 of the refracting portions 512A and 512B (base end side: light incident side).

7. Example of Application to Movable Body

The technology of the present disclosure (present technology) can be applied to various products. For example, the technology of the present disclosure may be implemented as a device mounted on any of movable bodies including a car, an electric car, a hybrid electric car, a motorcycle, a bicycle, personal mobility, an airplane, a drone, a ship, a robot, and the like.

Figure 15:
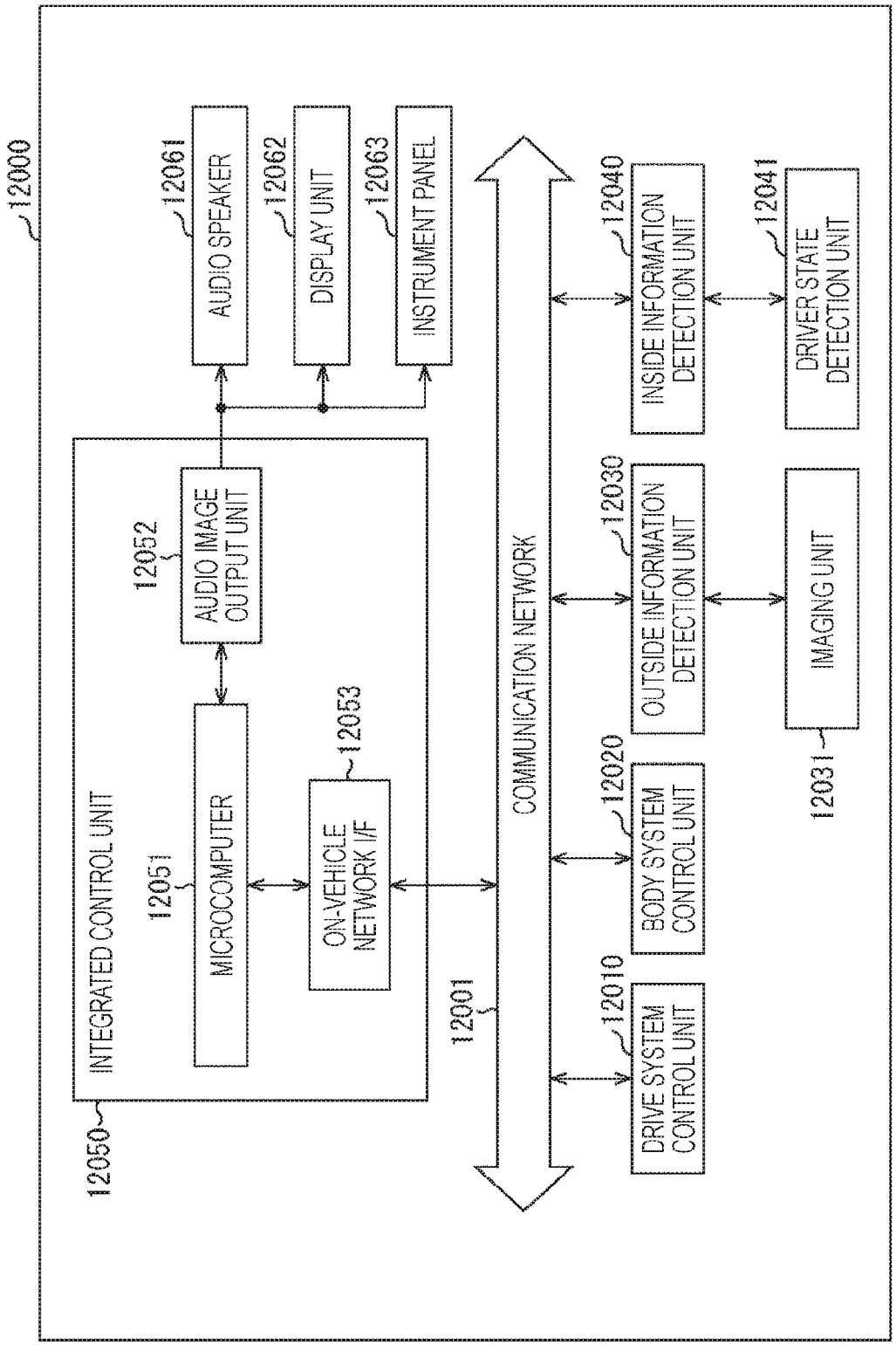

FIG. 15 is a block diagram showing a schematic configuration example of a vehicle control system which is an example of a mobile control system to which the technology according to the present disclosure can be applied.

A vehicle control system 12000 includes multiple electronic control units connected through a communication network 12001. In the example shown in FIG. 15, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output unit 12052, and an on-vehicle network interface (I/F) 12053 are illustrated.

The drive system control unit 12010 controls the operation of devices related to the drive system of the vehicle according to various programs. For example, the drive system control unit 12010 functions as a drive force generation device for generating a drive force of a vehicle such as an internal combustion engine or a drive motor, a drive force transmission mechanism for transmitting the drive force to wheels, a steering mechanism that adjusts the steering angle of the vehicle, and a controller such as a braking device that generates a braking force of the vehicle.

The body system control unit 12020 controls the operation of various devices equipped on the vehicle body according to various programs. For example, the body system control unit 12020 functions as a controller of a keyless entry system, a smart key system, a power window device, or a controller of various lamps such as a headlamp, a back lamp, a brake lamp, a blinker, or a fog lamp. In this case, the body system control unit 12020 may receive input of radio waves transmitted from a portable device substituting a key or signals of various switches. The body system control unit 12020 receives input of these radio waves or signals, and controls a door lock device, a power window device, a lamp, and the like of the vehicle.

The outside information detection unit 12030 detects information outside the vehicle equipped with the vehicle control system 12000. For example, an imaging unit 12031 is connected to the outside information detection unit 12030. The outside information detection unit 12030 causes the imaging unit 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging unit 12031 is an optical sensor that receives light and outputs an electrical signal corresponding to the amount of light received. The imaging unit 12031 can output an electric signal as an image or can output the electrical signal as distance measurement information. Additionally, the light received by the imaging unit 12031 may be visible light or non-visible light such as infrared light.

The inside information detection unit 12040 detects information inside the vehicle. For example, a driver state detection unit 12041 that detects a state of a driver is connected to the inside information detection unit 12040. The driver state detection unit 12041 includes a camera for capturing an image of the driver, for example, and the inside information detection unit 12040 may calculate the degree of fatigue or concentration of the driver or determine whether the driver is asleep, on the basis of the detection information input from the driver state detection unit 12041.

The microcomputer 12051 can calculate a control target value of the drive force generation device, the steering mechanism, or the braking device on the basis of the information outside or inside the vehicle acquired by the outside information detection unit 12030 or the inside information detection unit 12040, and output a control command to the drive system control unit 12010. For example, the microcomputer 12051 can perform coordinated control aimed to achieve functions of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, or the like.

Additionally, the microcomputer 12051 can control the drive force generation device, the steering mechanism, the braking device, or the like on the basis of the information around the vehicle acquired by the outside information detection unit 12030 or the inside information detection unit 12040, to perform coordinated control aimed for automatic driving of traveling autonomously without depending on the driver's operation, for example.

Additionally, the microcomputer 12051 can output a control command to the body system control unit 12020 on the basis of the information outside the vehicle acquired by the outside information detection unit 12030. For example, the microcomputer 12051 can control the headlamp according to the position of the preceding vehicle or oncoming vehicle detected by the outside information detection unit 12030, and perform coordinated control aimed for glare prevention such as switching from high beam to low beam.

The audio image output unit 12052 transmits an output signal of at least one of audio or image to an output device capable of visually or aurally notifying a passenger or the outside of a vehicle of information. In the example of FIG. 15, an audio speaker 12061, a display unit 12062, and an instrument panel 12063 are illustrated as examples of the output device. The display unit 12062 may include at least one of an onboard display or a head-up display, for example.

Figure 16:
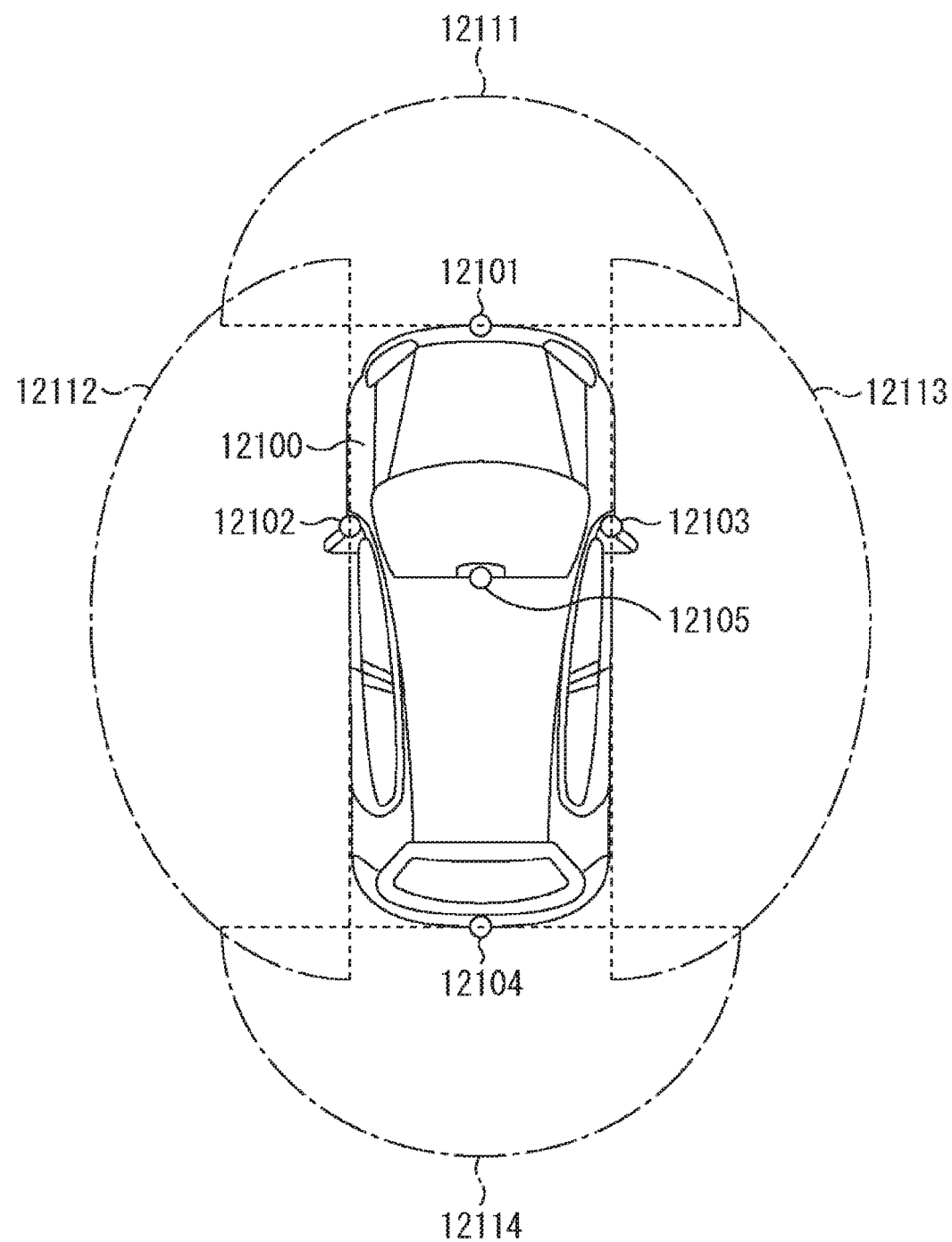

FIG. 16 is a diagram showing an example of the installation position of the imaging unit 12031.

In FIG. 16, imaging portions 12101, 12102, 12103, 12104, and 12105 are included as the imaging unit 12031.

For example, the imaging portions 12101, 12102, 12103, 12104, and 12105 are provided in positions such as a front nose, a side mirror, a rear bumper, a back door, and an upper portion of a windshield in a vehicle compartment of the vehicle 12100. The imaging portion 12101 provided on the front nose and the imaging portion 12105 provided on the upper portion of the windshield in the vehicle compartment mainly acquire images of the front of the vehicle 12100. The imaging portions 12102 and 12103 provided on the side mirrors mainly acquire images of the side of the vehicle 12100. The imaging portion 12104 provided on the rear bumper or the back door mainly acquires an image of the rear of the vehicle 12100. The imaging portion 12105 provided on the upper portion of the windshield in the vehicle compartment is mainly used to detect a preceding vehicle or a pedestrian, an obstacle, a traffic light, a traffic sign, a lane, or the like.

Note that FIG. 16 shows an example of the imaging range of the imaging portions 12101 to 12104. An imaging range 12111 indicates the imaging range of the imaging portion 12101 provided in the front nose, imaging ranges 12112 and 12113 indicate the imaging ranges of the imaging portions 12102 and 12103 provided on the side mirrors, respectively, and an imaging range 12114 indicates the imaging range of the imaging portion 12104 provided in the rear bumper or the back door. For example, by superimposing the pieces of image data captured by the imaging portions 12101 to 12104, a bird's eye view image of the vehicle 12100 as viewed from above can be obtained.

At least one of the imaging portions 12101 to 12104 may have a function of acquiring distance information. For example, at least one of the imaging portions 12101 to 12104 may be a stereo camera including multiple imaging devices, or may be an imaging device having pixels for phase difference detection.

For example, the microcomputer 12051 can measure the distance to each three-dimensional object in the imaging ranges 12111 to 12114 and the temporal change of this distance (relative velocity with respect to vehicle 12100) on the basis of the distance information obtained from the imaging portions 12101 to 12104, to extract, as a preceding vehicle, the closest three-dimensional object on the traveling path of the vehicle 12100 in particular, among three-dimensional objects traveling at a predetermined speed (e.g., 0 km/h or more) in substantially the same direction as the vehicle 12100. Moreover, the microcomputer 12051 can set an inter-vehicle distance to be secured in advance before the preceding vehicle, and perform automatic brake control (including follow-up stop control), automatic acceleration control (including follow-up start control), and the like. As described above, it is possible to perform coordinated control aimed for automatic driving of traveling autonomously without depending on the driver's operation, for example.

For example, on the basis of the distance information obtained from the imaging portions 12101 to 12104, the microcomputer 12051 can extract three-dimensional object data regarding three-dimensional objects by classifying the data into three-dimensional objects such as two-wheeled vehicle, ordinary vehicle, large vehicle, pedestrian, and telephone pole, and use the data for automatic avoidance of obstacles. For example, the microcomputer 12051 identifies obstacles around the vehicle 12100 into obstacles visible and obstacles hardly visible to the driver of the vehicle 12100. Then, the microcomputer 12051 can determine the collision risk indicating the degree of risk of collision with each obstacle, and when the collision risk is a setting value or more and there is a possibility of a collision, can perform driving support for collision avoidance by outputting a warning to the driver through the audio speaker 12061 or the display unit 12062, or by performing forcible deceleration or avoidance steering through the drive system control unit 12010.

At least one of the imaging portions 12101 to 12104 may be an infrared camera that detects infrared light. For example, the microcomputer 12051 can recognize a pedestrian by determining whether or not a pedestrian is present in the images captured by the imaging portions 12101 to 12104. Such pedestrian recognition is performed by a procedure of extracting feature points in images captured by the imaging portions 12101 to 12104 as infrared cameras, and a procedure of performing pattern matching processing on a series of feature points indicating the outline of an object to determine whether or not the object is a pedestrian, for example. If the microcomputer 12051 determines that a pedestrian is present in the images captured by the imaging portions 12101 to 12104 and recognizes the pedestrian, the audio image output unit 12052 causes the display unit 12062 to superimpose a square outline for emphasis on the recognized pedestrian. Additionally, the audio image output unit 12052 may cause the display unit 12062 to display an icon or the like indicating a pedestrian in a desired position.

In the vehicle control system 12000 described above, the optical communication connectors 100A and 100B described with reference to FIGS. 1, 2, 3, 4, 5, 6, 7, 8, 9, 10, 11, 12A, 12B, 13, and 14 can be applied to the various interfaces shown in FIG. 15. For example, the optical communication connectors 100A and 100B are applicable as communication connectors in the on-vehicle network I/F 12053.

Additionally, the electronic device 10 of FIG. 1 can be applied to the integrated control unit 12050, for example. Additionally, the optical communication cable 20 of FIG. 1 is applicable to connection with various interfaces and devices inside and outside the vehicle control system 12000, in addition to the communication network. Moreover, at least some components of the electronic device 10 may be implemented in a module for the integrated control unit 12050 (e.g., an integrated circuit module configured with one die). Moreover, at least some components of the electronic device 10 may be implemented by multiple control units of the vehicle control system 12000 shown in FIG. 15.

Note that the embodiments of the present technology are not limited to the above-described embodiments, and various modifications can be made without departing from the scope of the present technology.

Additionally, the present technology can have the following configurations.

(1)

An optical communication connector including a collimating lens that collimates light from multiple optical transmission lines transmitting optical signals, and a refracting portion that refracts and emits light emitted from the collimating lens, in which in the collimating lens, at least some of transmission channels and reception channels corresponding to the multiple optical transmission lines are thinned out.

(2)

The optical communication connector according to the above (1), in which in the collimating lens, the transmission channels and the reception channels are arranged in a staggered manner.

(3)

The optical communication connector according to the above (1) or (2), in which the refracting portion has an antireflection portion.

(4)

The optical communication connector according to any one of the above (1) to (3) further including a scattering portion that scatters at least a part of the light emitted from the refracting portion.

(5)

An optical communication cable including multiple optical transmission lines transmitting optical signals, and an optical communication connector that has a collimating lens that collimates light from the multiple optical transmission lines and a refracting portion that refracts and emits light emitted from the collimating lens, at least some of transmission channels and reception channels corresponding to the multiple optical transmission lines being thinned out in the collimating lens.

(6)

An electronic device including an optical communication connector having a collimating lens that collimates light from multiple optical transmission lines transmitting optical signals, and a refracting portion that refracts and emits light emitted from the collimating lens, in which in the collimating lens, at least some of transmission channels and reception channels corresponding to the multiple optical transmission lines are thinned out.

(7)

An optical communication connector including a collimating lens that collimates light from multiple optical transmission lines transmitting optical signals, and a refracting portion that refracts and emits light emitted from the collimating lens, in which in the collimating lens, at least some of transmission channels and reception channels corresponding to the multiple optical transmission lines are arranged with a shifted pitch.

(8)

The optical communication connector according to the above (7), in which in the collimating lens, a channel of an odd-numbered row and a channel of an even-numbered row are shifted by substantially a half pitch in a row direction.

(9)

The optical communication connector according to the above (7) or (8) further including a scattering portion that scatters at least a part of the light emitted from the refracting portion.

(10)

An optical communication cable including multiple optical transmission lines transmitting optical signals, and an optical communication connector that has a collimating lens that collimates light from the multiple optical transmission lines and a refracting portion that refracts and emits light emitted from the collimating lens, at least some of transmission channels and reception channels corresponding to the multiple optical transmission lines being arranged with a shifted pitch in the collimating lens.

(11)

An electronic device including an optical communication connector having a collimating lens that collimates light from multiple optical transmission lines transmitting optical signals, and a refracting portion that refracts and emits light emitted from the collimating lens, in which in the collimating lens, at least some of transmission channels and reception channels corresponding to the multiple optical transmission lines are arranged with a shifted pitch.

(12)

An optical communication connector including a collimating lens that collimates light from multiple optical transmission lines transmitting optical signals, and a refracting portion that refracts and emits light emitted from the collimating lens, in which the collimating lens is arranged so as to be offset by a predetermined distance from a center of a fitting surface.

(13)

The optical communication connector according to the above (12), in which the collimating lens is arranged so as to be offset toward an upper surface or a lower surface by a predetermined distance from the center of the fitting surface.

(14)

The optical communication connector according to the above (12) or (13) further including a scattering portion that scatters at least a part of the light emitted from the refracting portion.

(15)

An optical communication cable including multiple optical transmission lines transmitting optical signals, and an optical communication connector that has a collimating lens that collimates light from the optical transmission lines and a refracting portion that refracts and emits light emitted from the collimating lens, the collimating lens being arranged so as to be offset by a predetermined distance from a center of a fitting surface.

(16)

An electronic device including an optical communication connector having a collimating lens that collimates light from multiple optical transmission lines transmitting optical signals, and a refracting portion that refracts and emits light emitted from the collimating lens, in which the collimating lens is arranged so as to be offset by a predetermined distance from a center of a fitting surface.

(17)

An optical communication connector including a collimating lens that collimates light from multiple optical transmission lines transmitting optical signals, and a refracting portion that refracts and emits light emitted from the collimating lens, in which in the collimating lens, of transmission channels and reception channels corresponding to the multiple optical transmission lines, only the transmission channels or only the reception channels are arranged adjacent to one another.

(18)

The optical communication connector according to the above (17) further including a scattering portion that scatters at least a part of the light emitted from the refracting portion.

(19)

An optical communication cable including multiple optical transmission lines transmitting optical signals, and an optical communication connector that has a collimating lens that collimates light from the multiple optical transmission lines and a refracting portion that refracts and emits light emitted from the collimating lens, of transmission channels and reception channels corresponding to the multiple optical transmission lines, only the transmission channels or only the reception channels being arranged adjacent to one another in the collimating lens.

(20)

An electronic device including an optical communication connector having a collimating lens that collimates light from multiple optical transmission lines transmitting optical signals, and a refracting portion that refracts and emits light emitted from the collimating lens, in which in the collimating lens, of transmission channels and reception channels corresponding to the multiple optical transmission lines, only the transmission channels or only the reception channels are arranged adjacent to one another.

REFERENCE SIGNS LIST

10 Electronic device
11 Optical transceiver
20 Optical communication cable
21 Cable main body
100A, 100B Optical communication connector
101 Light emitting unit
102 Light receiving unit
111A, 111B lens portion
112A, 112B Refracting portion
113A, 113B Scattering member
114A, 114B Scattering member
121A, 121B Collimating lens
122A, 122B Flat surface
123A, 123B Scattering portion
131A lens
132A, 132B Refraction surface
151A, 151B Optical fiber
221A, 221B Collimating lens
231A lens
311A, 311B lens portion
312A, 312B Refracting portion
321A, 321B Collimating lens
322A, 322B Flat surface
332A, 332B Refraction surface
421A, 421B Collimating lens
431A lens
512A, 512B Refracting portion
522A, 522B Flat surface
532A, 532B Refraction surface
542A, 542B Antireflection portion

The invention claimed is:

1. An optical communication connector comprising:
   a collimating lens configured to collimate light from a plurality of optical transmission lines that transmits optical signals, wherein the collimating lens comprises an upper stage of lenses and a lower stage of lenses, and wherein the upper stage of lenses and the lower stage of lenses correspond to the plurality of optical transmission lines; and
   a refracting portion configured to:
      refract light emitted from the collimating lens; and
      emit the refracted light, wherein
         in the collimating lens, alternate lenses in the upper stage of lenses and alternate lenses in the lower stage of lenses are configured for optical transmission or optical reception.

2. The optical communication connector according to claim 1, wherein
   the refracting portion has an antireflection portion.

3. The optical communication connector according to claim 1 further comprising
   a scattering portion that scatters at least a part of the light emitted from the refracting portion.

4. An optical communication cable comprising:
   a plurality of optical transmission lines that transmits optical signals, and
   an optical communication connector that has:
      a collimating lens configured to collimate light from the plurality of optical transmission lines, wherein the collimating lens comprises an upper stage of lenses and a lower stage of lenses, and wherein the upper stage of lenses and the lower stage of lenses correspond to the plurality of optical transmission lines; and
      a refracting portion configured to:
         refract light emitted from the collimating lens; and
         emit the refracted light, wherein in the collimating lens, alternate lenses in the upper stage of lenses and alternate lenses in the lower stage of lenses are configured for optical transmission or optical reception.

5. An electronic device comprising:
   an optical communication connector that includes:
   a collimating lens configured to collimate light from a plurality of optical transmission lines that transmits optical signals, wherein the collimating lens comprises an upper stage of lenses and a lower stage of lenses, and wherein the upper stage of lenses and the lower stage of lenses correspond to the plurality of optical transmission lines; and a refracting portion configured to:
  refract light emitted from the collimating lens; and
  emit the refracted light, wherein
    in the collimating lens, alternate lenses in the upper stage of lenses and alternate lenses in the lower stage of lenses are configured for optical transmission or optical reception.

6. The optical communication connector according to claim 1, wherein the alternate lenses in the upper stage of lenses and the alternate lenses in the lower stage of lenses have a staggered arrangement.

\* \* \* \* \*